United States Patent
Urness et al.

(10) Patent No.: US 11,187,902 B2
(45) Date of Patent: Nov. 30, 2021

(54) TWO-DIMENSIONAL LIGHT HOMOGENIZATION

(71) Applicant: Akonia Holographies LLC, Longmont, CO (US)

(72) Inventors: Adam Urness, Louisville, CO (US); Mark R. Ayres, Boulder, CO (US); Friso Schlottau, Lyons, CO (US); Kenneth E. Anderson, Longmont, CO (US)

(73) Assignee: Akonia Holographics LLC, Longmont, CO (US)

( * ) Notice: Subject to any disclaimer, the term of this patent is extended or adjusted under 35 U.S.C. 154(b) by 0 days.

(21) Appl. No.: 16/649,107

(22) PCT Filed: Sep. 27, 2018

(86) PCT No.: PCT/US2018/053182
§ 371 (c)(1),
(2) Date: Mar. 19, 2020

(87) PCT Pub. No.: WO2019/079014
PCT Pub. Date: Apr. 25, 2019

(65) Prior Publication Data
US 2020/0225476 A1  Jul. 16, 2020

Related U.S. Application Data

(60) Provisional application No. 62/572,779, filed on Oct. 16, 2017.

(51) Int. Cl.
*G02B 27/01* (2006.01)
*F21V 8/00* (2006.01)

(52) U.S. Cl.
CPC ....... *G02B 27/0172* (2013.01); *G02B 6/0023* (2013.01); *G02B 6/0055* (2013.01); *G02B 6/0061* (2013.01); *G02B 2027/0118* (2013.01)

(58) Field of Classification Search
CPC .......... G02B 27/0172; G02B 6/0023; G02B 6/0055; G02B 6/0061; G02B 2027/0118; G02B 2027/0178
See application file for complete search history.

(56) References Cited

U.S. PATENT DOCUMENTS

| | | | |
|---|---|---|---|
| 4,017,158 A | 4/1977 | Booth | |
| 7,613,373 B1 * | 11/2009 | DeJong | G02B 6/0028 359/629 |

(Continued)

FOREIGN PATENT DOCUMENTS

| | | |
|---|---|---|
| CN | 1685291 A | 10/2005 |
| CN | 1774661 A | 5/2006 |

(Continued)

*Primary Examiner* — Ellen E Kim
(74) *Attorney, Agent, or Firm* — Michael H. Lyons

(57) ABSTRACT

An optical reflective device including a waveguide and longitudinal light homogenizing structures mounted to a surface of the waveguide are disclosed. The light homogenizing structures may receive input light and produce longitudinally homogenized light by homogenizing the input light along a longitudinal dimension of the waveguide. A cross-coupler in the waveguide may receive the longitudinally homogenized light from the light homogenizing structures and may produce two-dimensionally homogenized light by redirecting the longitudinally homogenized light along a lateral dimension of the waveguide. The light homogenizing structures may include partially reflective layers, stacked substrate layers with refractive index mismatches, and/or a combination of partially and fully reflective layers. The cross coupler and/or partially reflective layer may be formed using sets of holograms. A prism or a slanted substrate surface may couple the input light into the substrate.

20 Claims, 19 Drawing Sheets

(56) References Cited

U.S. PATENT DOCUMENTS

| | | | | |
|---|---|---|---|---|
| 8,233,204 B1* | 7/2012 | Robbins | ............ | G02B 27/0149 |
| | | | | 359/15 |
| 8,531,773 B2* | 9/2013 | DeJong | ............. | G02B 27/0101 |
| | | | | 359/630 |
| 9,456,744 B2* | 10/2016 | Popovich | ............... | A61B 3/113 |
| 9,465,227 B2* | 10/2016 | Popovich | ............... | G02B 6/005 |
| 2006/0132914 A1* | 6/2006 | Weiss | ................... | G02B 27/143 |
| | | | | 359/462 |
| 2010/0246003 A1* | 9/2010 | Simmonds | ......... | G02B 27/0172 |
| | | | | 359/567 |
| 2015/0277375 A1 | 10/2015 | Large et al. | | |
| 2016/0027943 A1* | 1/2016 | Bracamonte | ........ | G03H 1/0248 |
| | | | | 136/246 |
| 2016/0284910 A1* | 9/2016 | Bouchard | ........... | H01L 31/0547 |
| 2017/0031161 A1* | 2/2017 | Rossini | ............. | G02B 27/0081 |
| 2017/0075119 A1 | 3/2017 | Schultz et al. | | |
| 2017/0131551 A1 | 5/2017 | Robbins et al. | | |
| 2017/0285348 A1 | 10/2017 | Ayres et al. | | |
| 2018/0212399 A1* | 7/2018 | Menezo | ............... | H01S 5/1237 |

FOREIGN PATENT DOCUMENTS

| | | | | | |
|---|---|---|---|---|---|
| CN | | 1813213 | A | 8/2006 | |
| CN | | 103562802 | A | 2/2014 | |
| CN | | 103823267 | A | 5/2014 | |
| CN | | 105572873 | A | 5/2016 | |
| CN | | 106133569 | A | 11/2016 | |
| CN | | 107290816 | A | 10/2017 | |
| WO | WO-2014080155 | A1 | * | 5/2014 | ............ G02B 27/48 |

* cited by examiner

TWO-DIMENSIONAL LIGHT HOMOGENIZATION

This application claims priority to U.S. provisional patent application No. 62/572,779, filed on Oct. 16, 2017, which is hereby incorporated by reference herein in its entirety.

BACKGROUND

The present relates generally to optical reflective devices, including light homogenization in optical reflective devices.

Optical waveguides have a physical structure that guides electromagnetic waves in the optical spectrum (e.g., light). In some cases, an optical waveguide can be an optical fiber or a planar waveguide structure. An optical waveguide can use total internal reflection (TIR) to guide light to an output. Depending on an incidence angle of light with respect to surface normal of a TIR surface, the intensity or power distribution of the light may vary. Thus, an area of an optical waveguide may receive more or less energy from the light being guided due to the incidence angle of the light. In some cases, this spatially-inhomogeneous power distribution is irrelevant to the operation of the optical waveguide. In other cases, however, inhomogeneity of light propagated through a waveguide can result in performance deficits for certain TIR device applications. Accordingly, it may be beneficial to homogenize the power distribution of light for a particular area of an optical waveguide or TIR device.

A TIR imaging device may suffer performance deficits due to mode inhomogeneity of light propagated through a waveguide. For example, light may enter a waveguide, propagate through the waveguide, and reflect or diffract towards an exit pupil to form a projected image. The waveguide may include a light coupling device (e.g., an input coupler, cross coupler and/or output coupler). However, light propagated through the waveguide may exhibit spatially-inhomogeneous power distribution within the coupled modes. This spatially-inhomogeneous power distribution may also lead to a non-uniform intensity profile at the light coupling device. Accordingly, this non-uniform intensity profile may broaden a point spread function associated with an output beam reflected towards the exit pupil thereby reducing a resolution of the projected image and resulting in non-uniform brightness of the projected image.

SUMMARY

The described features generally relate to one or more improved methods, systems, or devices for homogenizing light in one or two dimensions. The methods, systems, or devices may employ one or more light homogenizers or homogenizing techniques to change the power distribution of light in a waveguide or TIR device.

In some examples, an optical device may include a waveguide having a waveguide surface. The waveguide surface may have a longitudinal dimension and a perpendicular lateral dimension. Light homogenizing structures may be formed on the waveguide. The light homogenizing structures may receive input light and produce longitudinally homogenized light by homogenizing the input light along the longitudinal dimension. The optical device may include a cross-coupler that receives the longitudinally homogenized light from the light homogenizing structures and that produces two-dimensionally homogenized light by redirecting the longitudinally homogenized light along the lateral dimension. The cross-coupler may include holograms that diffract light on both upwards and downward passes.

In some examples, the light homogenizing structures may include a substrate and a partial reflector on or in the substrate. The partial reflector may include a dielectric coating, a metallic coating, a polymer film, a set of holograms, or other structures. In some examples, the light homogenizing structures may include a substrate having opposing first and second surfaces, a first fully reflective layer on the first surface, a second fully reflective layer on the second surface, and a partially reflective layer on the substrate and interposed between the first and second fully reflective layers. In some examples, the light homogenizing structures may include a first substrate on the waveguide surface and having a first index of refraction, a second substrate on first substrate and having a second index of refraction that is different from the first index of refraction, and a third substrate on the first substrate and having a third index of refraction that is different from the second index of refraction.

In some examples, the light homogenizing structures may include a prism mounted to a surface of the substrate opposite the waveguide surface. The prism may direct input light into the substrate and towards the partial reflector. In some examples, the light homogenizing structures include a substrate having a slanted side surface that couples the input light into the substrate. The partial reflector may have a spatially-varying reflectivity and may produce homogenized light within approximately one pupil period at and of the waveguide opposite to the prism.

BRIEF DESCRIPTION OF THE DRAWINGS

A further understanding of the nature and advantages of implementations of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
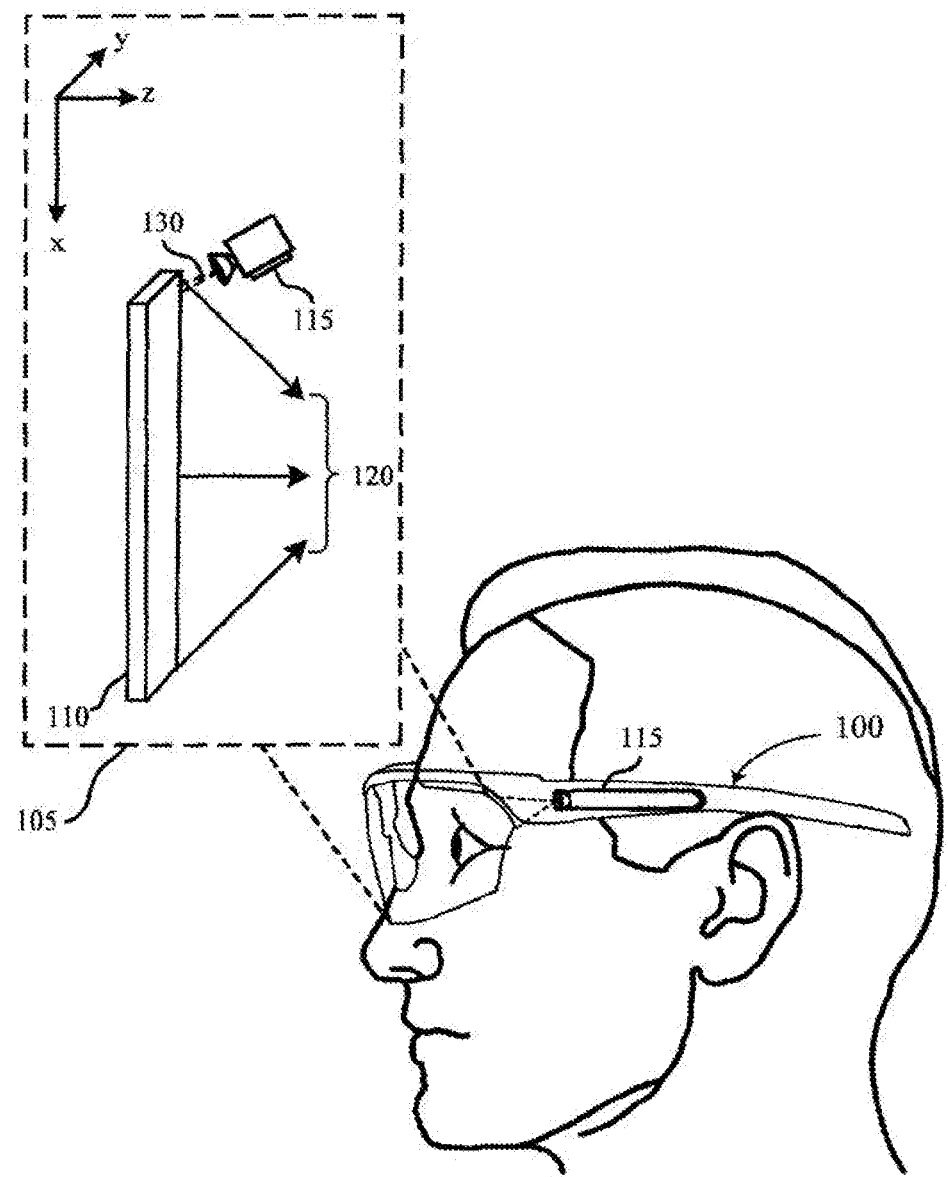
FIG. 1 is a diagram of an illustrative head mounted display (HMD) in which the principles included herein may be implemented in accordance with some embodiments.

An optical head-mounted display (HMD) is a wearable device that has the capability of reflecting projected images as well as allowing a user to experience augmented reality. Head-mounted displays typically involve near-eye optics to create "virtual" images. In the past HMDs have dealt with a variety of technical limitations that reduced image quality and increased weight and size. Past implementations have included conventional optics to reflect, refract or diffract light, however, the designs tend to be bulky. Additionally, conventional mirrors and grating structures have inherent limitations. For example, a conventional mirror may have a reflective axis that is necessarily coincident with surface normal. The reflective axis of a conventional mirror may lead to suboptimal orientation or performance of the mirror. Also, conventional grating structures may include multiple reflective axes that covary unacceptably with incidence angle and/or wavelength.

Accordingly, a device for reflecting light may include features that reflect light about a reflective axis not constrained to surface normal and whose angle of reflection for a given angle of incidence is constant at multiple wavelengths. Embodiments of the device may have substantially constant reflective axes (i.e., reflective axes that have reflective axis angles that vary by less than 1.0 degree) across a range of incidence angles for incident light of a given wavelength, and this phenomenon may be observed with incident light at various wavelengths.

In some examples, a waveguide may be provided with one or more light homogenizing elements to minimize the point spread function of the output beam and improve projected image qualities such as resolution and brightness. The light homogenizing element may be formed in or on substrates overlapping (e.g., on a surface of) the waveguide (e.g., the light homogenizing element may be external to the waveguide). As an example, a light homogenizing element may be a partially reflective element positioned parallel to the waveguide surfaces. In some cases, the partially reflective element may be disposed at the substrate interfaces of the waveguide or throughout a substrate (e.g., a slab or duct structure) mounted to the waveguide. In some examples, the partially reflective element may be an optical element (e.g., a skew mirror) with a reflective axis perpendicular to the waveguide surface. A light homogenizing element may split the energy of the propagating light. For example, a first portion of the energy of light propagating in a first mode direction (e.g., a downward ray direction) incident on a surface of the light homogenizing element may reflect in a second mode direction (e.g., an upward ray direction) different from the first mode direction. A second portion of the energy of light propagating in the first mode direction incident on the surface of the light homogenizing element may refract or continue propagating in the first mode direction.

Aspects of the disclosure are initially described in the context of an apparatus for reflecting light towards an eye box situated at a fixed distance away from a skew mirror. Specific examples are described for apparatus including a grating medium. The grating medium may include one or more grating structures. A grating structure may be configured to reflect light of a particular wavelength about a reflective axis offset from a surface normal of the grating structure at a particular plurality of incident angles. Aspects of the disclosure are further illustrated by and described with reference to apparatus diagrams, system diagrams, and flowcharts that relate to light homogenization.

This description provides examples, and is not intended to limit the scope, applicability or configuration of implementations of the principles described herein. Rather, the ensuing description will provide those skilled in the art with an enabling description for implementing implementations of the principles described herein. Various changes may be made in the function and arrangement of elements.

Thus, various implementations may omit, substitute, or add various procedures or components as appropriate. For instance, it should be appreciated that the methods may be performed in an order different than that described, and that various steps may be added, omitted or combined. Also, aspects and elements described with respect to certain implementations may be combined in various other implementations. It should also be appreciated that the following systems, methods, devices, and software may individually or collectively be components of a larger system, wherein other procedures may take precedence over or otherwise modify their application.

FIG. 1 is an illustration of a head mounted display (HMD) 100 in which the principles included herein may be implemented. The HMD 100 may include eyewear or headwear in which a near-eye display (NED) 105 may be affixed in front of a user's eyes. The NED 105 may include a diffractive element portion disposed within or incorporated with a lens assembly of the HMD 100. In some examples, the diffractive element portion is a holographic optical element (HOE), which may be comprised of a skew mirror 110. Coordinates (x, y, and z-axis) are provided with reference to the skew mirror 110. The HMD 100 may include a light source or light projector 115 operatively coupled to the lens assembly. In some examples light source or light projector 115 may be operatively coupled to the lens assembly in a waveguide configuration. In some examples light source or light projector 115 may be operatively coupled to the lens assembly in a free space configuration.

The skew mirror 110 is a reflective device which may include a grating medium within which resides volume holograms or other grating structure. Skew mirror 110 may sometimes be referred to herein as volume holographic grating structure 110. The skew mirror 110 may include an additional layer such as a glass cover or glass substrate. The additional layer may serve to protect the grating medium from contamination, moisture, oxygen, reactive chemical species, damage, and the like. The additional layer may also be refractive index matched with the grating medium. The grating medium, by virtue of the grating structure residing therein, has physical properties that allow it to diffract light about an axis, referred to as a reflective axis, wherein angle of diffraction (henceforth referred to as angle of reflection) varies by less than 1° for multiple wavelengths of light incident upon the grating medium at a given angle of incidence. In some cases, the reflective axis is also constant for multiple wavelengths and/or angles of incidence. In some cases, the grating structure is formed by one or more holograms. The one or more holograms can be volume-phase holograms in some implementations. Other types of holograms may also be used in various implementations of the grating structure.

Similarly, implementations typically have substantially constant reflective axes (i.e., reflective axes have reflective axis angles that vary by less than 1°) across a range of incidence angles for incident light of a given wavelength, and this phenomenon may be observed with incident light at various wavelengths. In some implementations, the reflective axes remain substantially constant for every combination of a set of multiple incidence angles and a set of multiple wavelengths.

A hologram may be a recording of an interference pattern, and may include both intensity and phase information from the light used for the recording. This information may be recorded in a photosensitive medium that converts the interference pattern into an optical element that modifies the amplitude or the phase of subsequent incident light beams according to the intensity of the initial interference pattern. The grating medium may include a photopolymer, photorefractive crystals, dichromated gelatin, photo-thermo-refractive glass, film containing dispersed silver halide particles, or other material with the ability to react to and record an incident interference pattern. In some cases, coherent laser light may be used for recording and/or reading the recorded hologram.

In some cases, a hologram may be recorded using two or more laser beams known as recording beams. In some cases, the recording beams may be monochromatic collimated plane wave beams that are similar to each other except for angles at which they are incident upon the grating medium. In some implementations, the recording beams may have amplitude or phase distributions that differ from each other. The recording beams may be directed so that they intersect within the recording medium. Where the recording beams intersect, they interact with the recording medium in a way that varies according to the intensity of each point of the interference pattern. This creates a pattern of varying optical properties within the recording medium. For example, in some embodiments, a refractive index may vary within the recording medium. In some cases, the resulting interference pattern may be spatially distributed (e.g., with a mask or the like) in a manner that is uniform for all such grating structures recorded on the grating medium. In some cases, multiple grating structures may be superimposed within a single recording medium by varying the wavelength or the angle of incidence to create different interference patterns within the recording medium. In some cases, after one or more holograms are recorded in the medium, the medium may be treated with light in a post-recording light treatment. The post-recording light treatment may be performed with highly incoherent light to substantially consume remaining reactive medium components such as photoinitiator or photoactive monomer, such that photosensitivity of the recording medium is greatly reduced or eliminated. After recording of holograms or other grating structures in a recording medium has been completed, the medium is typically referred to as a grating medium. Grating mediums have typically been rendered non-photosensitive.

In some implementations, the grating structure includes a hologram generated by interference between multiple light beams referred to as recording beams. Typically, but not necessarily, the grating structure includes multiple holograms. The multiple holograms may be recorded using recording beams incident upon the grating medium at angles that vary among the multiple holograms (i.e., angle multiplexed), and/or using recording beams whose wavelengths vary among the multiple holograms (i.e., wavelength multiplexed). In some implementations, the grating structure includes a hologram recorded using two recording beams whose angles of incidence upon the grating medium vary while the hologram is being recorded, and/or whose wavelengths vary while the hologram is being recorded. Implementations further include a device wherein the reflective axis differs from surface normal of the grating medium by at least 1.0 degree; or at least by 2.0 degrees; or at least by 4.0 degrees; or at least by 9.0 degrees.

Light projector 115 may provide image-bearing light to the lens assembly. In some examples, the lens assembly and skew mirror 110 may be substantially flat with respect to the x-y plane; however, the lens assembly may include some curvature with respect to the x-y plane in certain implementations. Reflected light 120 from skew mirror 110 may be reflected towards an eye box situated at a fixed distance along the z-axis away from skew mirror 110. In some examples, skew mirror 110 may be contained at least partially within a waveguide. The waveguide may propagate incident light 130 by total internal reflection towards the skew mirror 110. In some examples, incident light 130 may propagate by free space towards skew mirror 110. The skew mirror 110 may include a grating medium made of a photopolymer. The skew mirror 110 may also include one or more grating structures within the grating medium. Each grating structure may include one or more holograms or sinusoidal volume gratings which may overlap with each other. In some embodiments, either holograms or non-holography sinusoidal volume gratings are used in the grating medium. In other embodiments, both holograms and non-holography sinusoidal volume gratings may be used in the same grating medium. A grating structure may be configured to reflect light of a particular wavelength about a reflective axis offset from a surface normal of the grating medium at a particular plurality of incidence angles. Each grating structure within the grating medium may be configured to reflect a portion of light toward an exit pupil in the eye box at a fixed distance from the waveguide.

Each grating structure (e.g., each volume hologram) may reflect light in a manner different from another grating structure. For example, a first grating structure may reflect incident light of a first wavelength at a first incidence angle, whereas a second grating structure may reflect incident light of a second wavelength at the first incidence angle (e.g., different grating structures may be configured to reflect different wavelengths of light for incident light of the same incidence angle). Also, a first grating structure may reflect incident light of a first wavelength at a first incidence angle, whereas a second grating structure may reflect incident light of the first wavelength at a second incidence angle (e.g., different grating structures may be configured to reflect the same wavelength of light for incident light of different incidence angles). Furthermore, a grating structure may reflect first incident light of a first wavelength and first incidence angle, and the grating structure may reflect second incident light at a second wavelength and second incidence angle about the same reflective axis. In this manner, different grating structures can be used to selectively reflect a particular wavelength of light for incident light at a given incidence angle. These different grating structures may be super-imposed within the grating medium of the skew mirror 110. The skew mirror 110 may have a substantially constant (uniform) reflective axis (e.g., each grating structure of the skew mirror 110 has a same substantially constant reflective axis).

In some examples, a head mounted display device may comprise a light source or light projector 115 for providing image-bearing light and a lens assembly. The lens assembly may include skew mirror 110. The lens assembly may comprise a light input section for receiving the image-bearing light from the light source or light projector 115. A waveguide may be disposed within the lens assembly and be operatively coupled to the light input section. The waveguide may comprise at least two substrates (not shown), a grating medium disposed between the at least two substrates, a first grating structure within the grating medium, and a second grating structure within the grating medium. In some examples, the waveguide may be omitted and the light source or light projector 115 may be operatively coupled to the lens assembly in a free space configuration. The first grating structure may be configured to reflect light of a wavelength about a first reflective axis of the first grating structure offset from a surface normal of the grating medium. The first grating structure may be configured to reflect light at a first incidence angle. The second grating structure may be configured to be at least partially non-overlapping with the first grating structure. The second grating structure may be configured to reflect light of the same wavelength as light reflected by the first grating structure. The second grating structure may be configured to reflect light of the wavelength about a second reflective axis of the second grating structure offset from the surface normal of the grating medium. The second grating structure may be configured to reflect light at a second incidence angle different from the first incidence angle.

FIG. 1 is merely illustrative and non-limiting. For example, an imaging component such as a light source (e.g., light source or light projector 115) may be provide image-bearing light. A waveguide component such as optical lens or the like may include a light input section. The light input section of the optical lens may receive the image-bearing light. A waveguide may be disposed within the optical lens and be operatively coupled to the light input section. In some cases, the waveguide may have a first waveguide surface and a second waveguide surface parallel to the first waveguide surface. A homogenizing component may be included within or mounted to (on and/or overlapping) the waveguide. For example, a partially reflective element may be located between a substrate (duct structure) mounted to the waveguide and the first waveguide surface or may be embedded within the substrate. The partially reflective element may have a reflective axis parallel to a waveguide surface normal. A coupling component such as a light coupling device may be operatively coupled to the waveguide medium.

Additional examples and various implementations are contemplated using the light homogenizing techniques described herein.

Figure 2A:
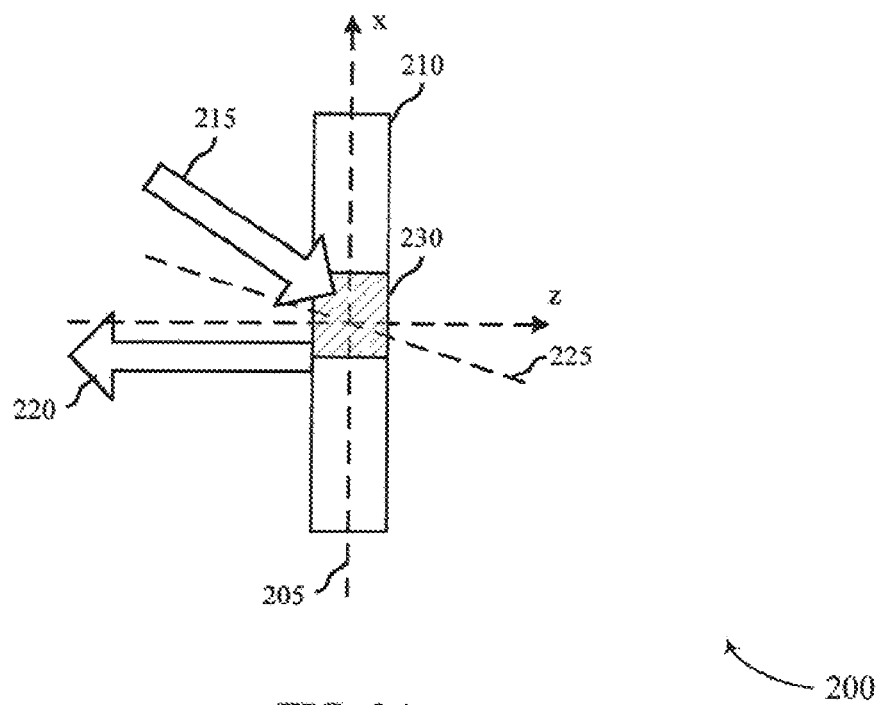
FIG. 2A is a diagram illustrating reflective properties of an illustrative skew mirror in real space in accordance with some embodiments.

FIG. 2A is a cross-section view 200 illustrating reflective properties of a skew mirror 210 in real space according to one example. The cross-section view 200 may include a grating structure such as hologram 230 in a grating medium. FIG. 2A omits skew mirror components other than the grating medium, such as an additional layer that might serve as a substrate or protective layer for the grating medium. The substrate or protective layer may serve to protect the grating medium from contamination, moisture, oxygen, reactive chemical species, damage, and the like. Implementations of a skew mirror for light coupling and/or pupil equalization may be partially reflective. For example, a skew mirror for pupil equalization may be configured to selectively reflect the rays of light where they are needed to form an exit pupil towards an eye box. The skew mirror for pupil equalization may be configured to avoid reflecting the rays of light for certain incidence angles where such a reflection would reflect the rays of light to an area that is not toward the desired exit pupil. Implementations of some skew mirror embodiments may require relatively high dynamic range recording medium to achieve high reflectivity over a relatively wide wavelength bandwidth and angle range for the resulting grating medium. By contrast, a skew mirror for pupil equalization may require less dynamic range thereby allowing each hologram to be stronger (e.g., recorded with a greater intensity and/or longer exposure time). A skew mirror composed of stronger holograms may provide a brighter image, or allow a dimmer light projector to provide an image of equal brightness. In some cases, pupil equalization techniques are not employed by a skew mirror that is used as a light coupling device. The skew mirror 205 is characterized by the reflective axis 225 at an angle measured with respect to the z axis. The z axis is normal to the skew mirror axis 210. The skew mirror 205 is illuminated with the incident light 215 with an internal incidence angle that is measured with respect to the z axis. The principal reflected light 220 may be reflected with internal reflection angle 180° measured with respect to the z axis. The principal reflected light 220 may correspond to wavelengths of light residing in the red, green, and blue regions of the visible spectrum.

The skew mirror 210 is characterized by the reflective axis 225 at an angle measured with respect to the z-axis. The z-axis is normal to the skew mirror axis 205. The skew mirror 210 is illuminated with the incident light 215 with an internal incidence angle that is measured with respect to the z-axis. The principal reflected light 220 may be reflected with internal reflection angle axis substantially normal to the surface of skew mirror 210. In some examples, the principal reflected light 220 may correspond to wavelengths of light residing in the red, green, and blue regions of the visible spectrum. For example, the red, green, and blue regions of the visible spectrum may include a red wavelength (e.g., 610-780 nm) band, green wavelength (e.g., 493-577 nm) band, and blue wavelength (e.g., 405-492 nm) band. In other examples, the principal reflected light 220 may correspond to wavelengths of light residing outside of the visible spectrum (e.g., infrared and ultraviolet wavelengths).

The skew mirror 210 may have multiple hologram regions which all share substantially the same reflective axis 225. These multiple regions, however, may each reflect light for different ranges of angles of incidence. For example, the bottom third of a HOE containing the skew mirror 210 may only contain that subset of grating structures that reflects light upwards towards a corresponding eye box. The middle third may then reflect light directly towards the corresponding eye box. Then the top third need only contain the subset of grating structures which reflects light downwards to the corresponding eye box.

Figure 2B:
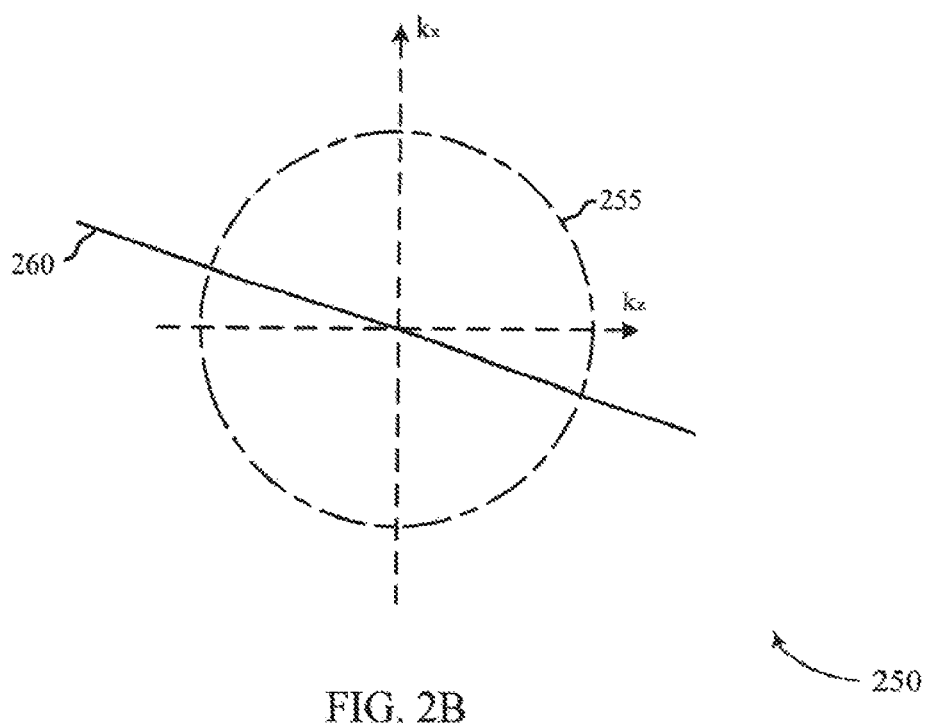
FIG. 2B illustrates an illustrative skew mirror in k-space in accordance with some embodiments.

FIG. 2B illustrates a k-space representation 250 of the skew mirror 210 of FIG. 2A. The k-space distributions of spatially varying refractive index components are typically denoted $\Delta n(\vec{k})$. $\Delta n(\vec{k})$ k-space distribution 260 passes through the origin, and has an angle measured with respect to the z-axis, equal to that of the reflective axis 225. Recording k-sphere 255 is the k-sphere corresponding to a particular writing wavelength. K-space 250 may include various k-spheres corresponding to wavelengths of light residing in the red, green, and blue regions of the visible spectrum.

The k-space formalism is a method for analyzing holographic recording and diffraction. In k-space, propagating optical waves and holograms are represented by three dimensional Fourier transforms of their distributions in real space. For example, an infinite collimated monochromatic reference beam can be represented in real space and k-space by equation (1):

$$E_r(\vec{r}) = A_r \exp(i\vec{k}_r \cdot \vec{r}) \xrightarrow{\mathcal{F}} E_r(\vec{k}) = A_r \delta(\vec{k} - \vec{k}_r), \quad (1)$$

where $E_r(\vec{r})$ is the optical scalar field distribution at all $\vec{r} = \{x, y, z\}$ 3D spatial vector locations, and its transform $E_r(\vec{k})$ is the optical scalar field distribution at all $\vec{k} = \{k_x, k_y, k_z\}$ 3D spatial frequency vectors. $A_r$ is the scalar complex amplitude of the field; and $\vec{k}_r$ is the wave vector, whose length indicates the spatial frequency of the light waves, and whose direction indicates the direction of propagation. In some implementations, all beams are composed of light of the same wavelength, so all optical wave vectors must have the same length, i.e., $|\vec{k}_r|=k_n$. Thus, all optical propagation vectors must lie on a sphere of radius $k_n=2\pi n_0/\lambda$, where $n_0$ is the average refractive index of the hologram ("bulk index"), and $\lambda$ is the vacuum wavelength of the light. This construct is known as the k-sphere. In other implementations, light of multiple wavelengths may be decomposed into a superposition of wave vectors of differing lengths, lying on different k-spheres.

Another important k-space distribution is that of the holograms themselves. Volume holograms usually consist of spatial variations of the index of refraction within a grating medium. The index of refraction spatial variations, typically denoted $\Delta n(\vec{r})$, can be referred to as index modulation patterns, the k-space distributions of which are typically denoted $\Delta n(\vec{r})$. The index modulation pattern created by interference between a first recording beam and a second recording beam is typically proportional to the spatial intensity of the recording interference pattern, as shown in equation (2):

$$\Delta n(\vec{r}) \propto |E_1(\vec{r})+E_2(\vec{r})|^2 = |E_1(\vec{r})|^2 + |E_2(\vec{r})|^2 + E_1^*(\vec{r})E_2(\vec{r}) + E_1(\vec{r})E_2^*(\vec{r}), \quad (2)$$

where $E_1(\vec{r})$ is the spatial distribution of the first recording beam field and $E_2(\vec{r})$ is the spatial distribution of the second recording beam field. The unary operator "*" denotes complex conjugation. The final term in equation (2), $E_1(\vec{r})E_2^*(\vec{r})$, maps the incident second recording beam into the diffracted first recording beam. Thus the following equation may result:

$$E_1(\vec{r})E_2^*(\vec{r}) \xrightarrow{\mathcal{F}} E_1(\vec{k}) \otimes E_2(\vec{k}), \quad (3)$$

where $\otimes$ is the 3D cross correlation operator. This is to say, the product of one optical field and the complex conjugate of another in the spatial domain becomes a cross correlation of their respective Fourier transforms in the frequency domain.

Typically, the hologram 230 constitutes a refractive index distribution that is real-valued in real space. Locations of $\Delta n(\vec{k})$ k-space distributions of the hologram 230 may be determined mathematically from the cross-correlation operations $E_2(\vec{k}) \otimes E_1(\vec{k})$ and $E_1(\vec{k}) \otimes E_2(\vec{k})$, respectively, or geometrically from vector differences $\vec{K}_{G+} = \vec{k}_1 - \vec{k}_2$ and $\vec{K}_{G-} = \vec{k}_2 - \vec{k}_1$, where $\vec{K}_{G+}$ and $\vec{K}_{G-}$ are grating vectors from the respective hologram $\Delta n(\vec{k})$ k-space distributions to the origin (not shown individually). Note that by convention, wave vectors are represented by a lowercase "k," and grating vectors by uppercase "K."

Once recorded, the hologram 230 may be illuminated by a probe beam to produce a diffracted beam. For purposes of the present disclosure, the diffracted beam can be considered a reflection of the probe beam, which can be referred to as an incident light beam (e.g., image-bearing light). The probe beam and its reflected beam are angularly bisected by the reflective axis 225 (i.e., the angle of incidence of the probe beam relative to the reflective axis has the same magnitude as the angle of reflection of the reflected beam relative to the reflective axis). The diffraction process can be represented by a set of mathematical and geometric operations in k-space similar to those of the recording process. In the weak diffraction limit, the diffracted light distribution of the diffracted beam is given by equation (4), $$E_d(\vec{k}) \propto \Delta n(\vec{k}) * E_p(\vec{k})\Big|_{|k|=k_n}, \quad (4)$$

where $E_d(\vec{k})$ and $E_p(\vec{k})$ are k-space distributions of the diffracted beam and the probe beam, respectively; and "*" is the 3D convolution operator. The notation "$\big|_{|\vec{k}|=k_n}$" indicates that the preceding expression is evaluated only where $|\vec{k}|=k_n$, i.e., where the result lies on the k-sphere. The convolution $\Delta n(\vec{k}) * E_p(\vec{k})$ represents a polarization density distribution, and is proportional to the macroscopic sum of the inhomogeneous electric dipole moments of the grating medium induced by the probe beam, $E_p(\vec{k})$.

Typically, when the probe beam resembles one of the recording beams used for recording, the effect of the convolution is to reverse the cross correlation during recording, and the diffracted beam will substantially resemble the other recording beam used to record a hologram. When the probe beam has a different k-space distribution than the recording beams used for recording, the hologram may produce a diffracted beam that is substantially different than the beams used to record the hologram. Note also that while the recording beams are typically mutually coherent, the probe beam (and diffracted beam) is not so constrained. A multi-wavelength probe beam may be analyzed as a superposition of single-wavelength beams, each obeying Equation (4) with a different k-sphere radius.

The term probe beam, sometimes used here when describing skew mirror properties in k-space, may be analogous to the term incident light, which is sometimes used here when describing skew mirror reflective properties in real space. Similarly, the term diffracted beam, sometimes used here when describing skew mirror properties in k-space, may be analogous to the term principal reflected light, sometimes used here when describing skew mirror properties in real space. Thus when describing reflective properties of a skew mirror in real space, it is sometimes stated that incident light is reflected by a hologram (or other grating structure) as principal reflected light, though to state that a probe beam is diffracted by the hologram to produce a diffracted beam says essentially the same thing. Similarly, when describing reflective properties of a skew mirror in k-space, it is sometimes stated that a probe beam is diffracted by a hologram (or other grating structure) to produce a diffracted beam, though to state that incident light is reflected by the grating structure to produce principal reflected light has the same meaning in the context of implementations of the present disclosure.

Figure 3A:
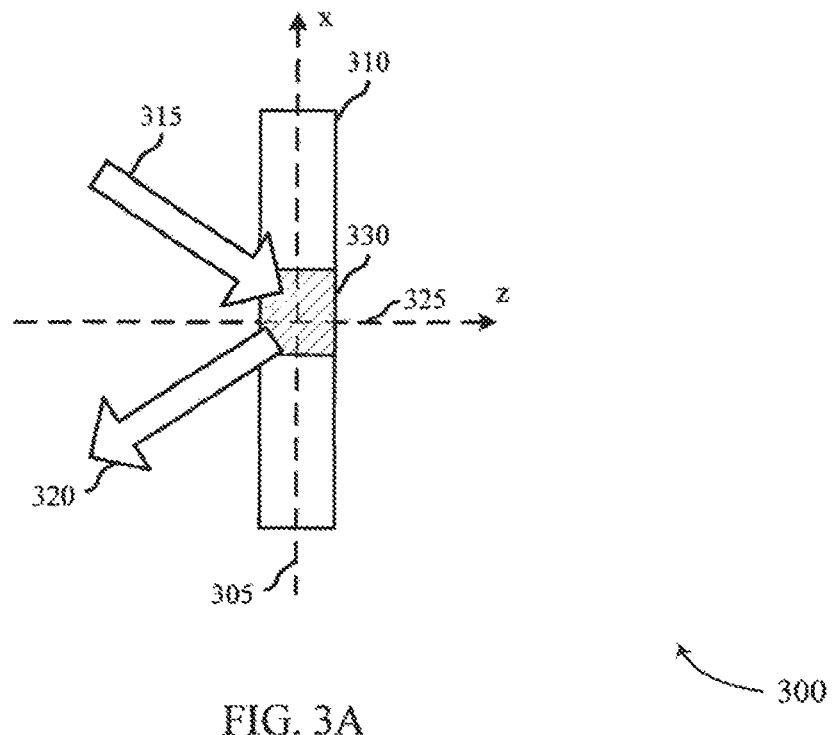
FIG. 3A is a diagram illustrating reflective properties of an illustrative skew mirror in real space in accordance with some embodiments.

FIG. 3A is a cross-section view 300 illustrating reflective properties of a skew mirror 310 in real space according to one example. The cross-section view 300 may include a grating structure such as hologram 330 in a grating medium. FIG. 3A omits skew mirror components other than the grating medium, such as an additional layer that might serve as a substrate or protective layer for the grating medium. The substrate or protective layer may serve to protect the grating medium from contamination, moisture, oxygen, reactive chemical species, damage, and the like. Implementations of a skew mirror for light homogenization may be partially reflective. In this manner, a skew mirror for light homogenization may be configured to selectively reflect the rays of light where propagating light may need to be homogenized. The skew mirror for light homogenization may be configured to avoid reflecting the rays of light for certain incidence angles where such a reflection may not be beneficial. Implementations of some skew mirror embodiments may require relatively high dynamic range recording medium to achieve high reflectivity over a relatively wide wavelength bandwidth and angle range for the resulting grating medium. In some cases, a skew mirror for light homogenization may require less dynamic range thereby allowing each hologram to be stronger (e.g., recorded with a greater intensity and/or longer exposure time). A skew mirror composed of stronger holograms may provide a brighter image, or allow a dimmer light projector to provide an image of equal brightness. The skew mirror 305 is characterized by the reflective axis 325 at an angle measured with respect to the z axis. The z axis is normal to the skew mirror axis 310. The reflective axis 325 may be coincident with the surface normal. The skew mirror 305 is illuminated with the incident light 315 with an internal incidence angle that is measured with respect to the z axis. The principal reflected light 320 may be reflected with an internal reflection angle that is equal to the internal incidence angle measured with respect to the z axis. The principal reflected light 320 may correspond to wavelengths of light residing in the red, green, and blue regions of the visible spectrum.

In some examples, the principal reflected light 320 may correspond to wavelengths of light residing in the red, green, and blue regions of the visible spectrum. For example, the red, green, and blue regions of the visible spectrum may include a red wavelength (e.g., 610-780 nm) band, green wavelength (e.g., 493-577 nm) band, and blue wavelength (e.g., 405-492 nm) band. In other examples, the principal reflected light 320 may correspond to wavelengths of light residing outside of the visible spectrum (e.g., infrared and ultraviolet wavelengths).

The skew mirror 310 may have multiple hologram regions which all share substantially the same reflective axis 325. These multiple regions, however, may each reflect light for different ranges of angles of incidence. For example, the bottom third of a HOE containing the skew mirror 310 may only contain that subset of grating structures that reflects light upwards towards a corresponding eye box. The middle third may then reflect light directly towards the corresponding eye box. Then the top third need only contain the subset of grating structures which reflects light downwards to the corresponding eye box.

Figure 3B:
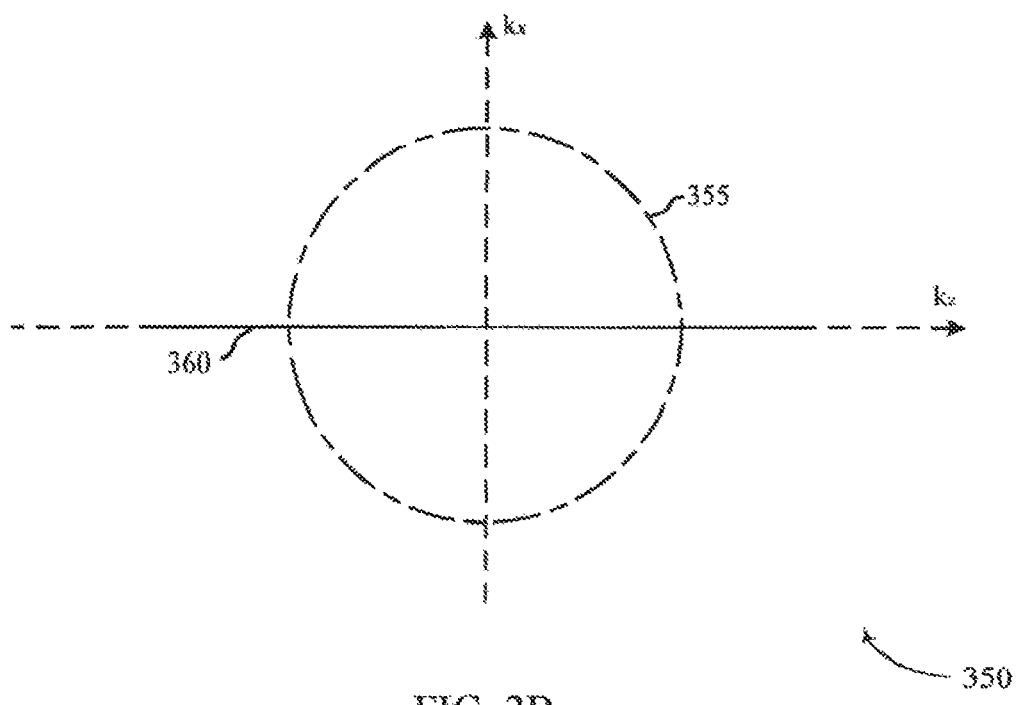
FIG. 3B illustrates an illustrative skew mirror in k-space in accordance with some embodiments.

FIG. 3B illustrates a k-space representation 350 of the skew mirror 310 of FIG. 3A. The k-space distributions of spatially varying refractive index components are typically denoted $\Delta n(\bar{k})$. $\Delta n(\bar{k})$ k-space distribution 360 passes through the origin, and is coincident with the z-axis, equal to that of the reflective axis 325. The reflective axis 325 is substantially parallel to surface normal. Recording k-sphere 355 is the k-sphere corresponding to a particular writing wavelength. K-space 350 may include various k-spheres corresponding to wavelengths of light residing in the red, green, and blue regions of the visible spectrum.

The k-space formalism method for analyzing holographic recording and diffraction associated with k-space representation 350 may be performed as described above with respect to FIG. 2A.

Figure 4A:
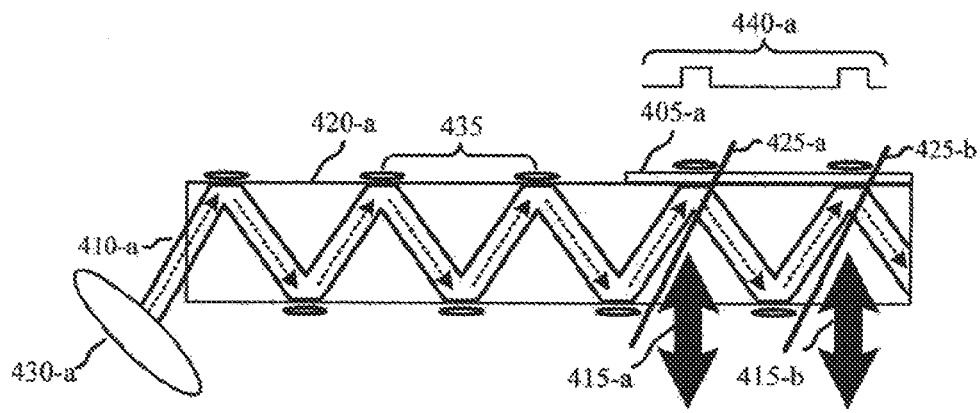
FIGS. 4A-4B illustrate an example of an illustrative optical system that supports light homogenization in accordance with some embodiments.

FIG. 4A illustrates an example of an optical system 400-$a$ that supports light homogenization in accordance with various aspects of the present disclosure. Optical system 400-$a$ may be utilized in an application such as, but not limited to, a head mounted display. The optical system 400-$a$ may employ selective coupling to allow a light coupling device 405-$a$ to reflect light 410-$a$ towards a specific location and project replicated pupils 415-$a$ and 415-$b$. The represented angles are internal angles relative to the surface normal of the waveguide 420-$a$, and the refraction at the substrate interface, as well as at the substrate air interface, is ignored for the purpose of illustration. Replicated pupils 415-$a$ and 415-$b$ may project an image corresponding to reflective axis 425-$a$ and 425-$b$, respectively. Light coupling device 405-$a$ may include a grating medium and a grating structure within the grating medium. The grating structure may have a plurality of holograms or sinusoidal volume gratings.

Optical system 400-$a$ illustrates a light source 430-$a$ where light 410-$a$ enters the waveguide 420-$a$. In order for reflected light 410-$a$ to be reflected towards the light coupling device 405-$a$ and project replicated pupils 415-$a$ and 415-$b$, light 410-$a$ may propagate through the waveguide 420-$a$ by total internal reflection. For example, light 410-$a$ may propagate through waveguide 420-$a$ and reflect between a downward mode direction and an upward mode direction. Light 410-$a$ may be an example of light from one pixel (e.g., an image point) and have a corresponding width (e.g., the pupil width). In some examples, light 410-$a$ may be an example of light from multiple pixels.

In some cases, reflected light 410-*a* in a TIR device may experience mode inhomogeneity. For example, gap 435 caused by TIR modes (e.g., spatial modes along a direction of propagation) of the light may be present between the consecutive interactions of light and the surface of the waveguide. In some cases, propagating light 410-*a* having large angles of incidence with respect to surface normal of waveguide 420-*a* may increase the size of gap 435 between the interaction of light 410-*a* and waveguide 420-*a*. Depending on a size of gap 435 caused by coupled mode of light 410-*a*, light 410-*a* reflecting within waveguide 420-*a* may only partially interact with light coupling device 405-*a*. This partial interaction in the non-overlapping mode inhomogeneity example of FIG. 4A may cause a non-uniform intensity profile at the light coupling device 405-*a*. The non-uniform intensity profile may result in a spatially-inhomogeneous power distribution 440-*a*. The spatially-inhomogeneous power distribution 440-*a* may cause a broadening of the point spread function (PSF) of an output beam associated with replicated pupils of the light coupling device 405-*a* thereby reducing the resolution of the projected image.

Figure 4B:
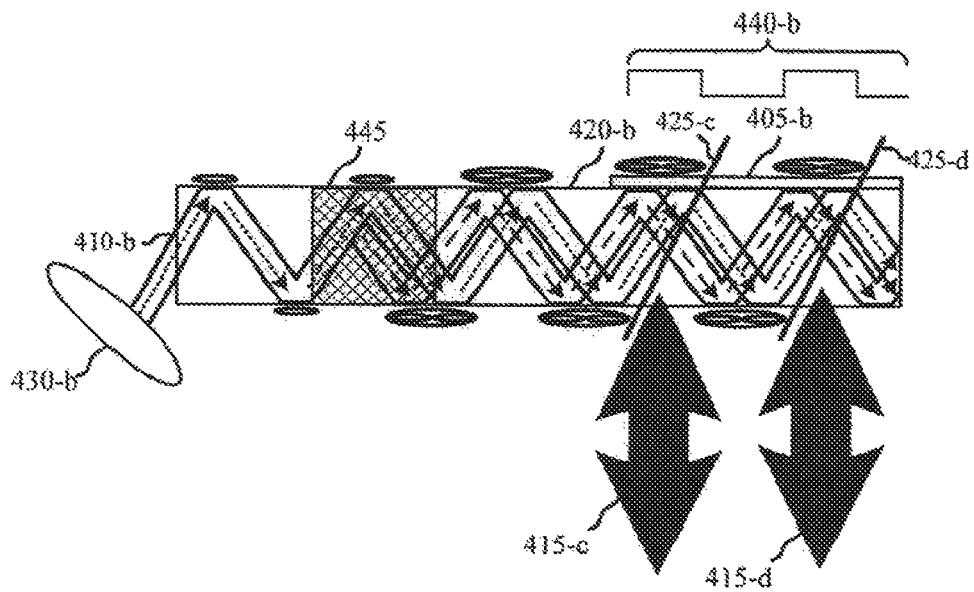

FIG. 4B illustrates a diagram of an optical system 400-*b* incorporating light homogenization. Optical system 400-*b* may be utilized in an application such as a head mounted display. The optical system 400-*b* may employ selective coupling to allow a light coupling device 405-*b* to reflect light 410-*b* towards a specific location and project replications 415-*c* and 415-*d*. The represented angles are internal angles relative to the surface normal of the waveguide 420-*b*, and the refraction at the substrate interface, as well as at the substrate air interface, is ignored for the purpose of illustration. Replicated pupils 415-*c* and 415-*d* may project an image corresponding to reflective axis 425-*c* and 425-*d*, respectively. Light coupling device 405-*b* may include a grating medium and a grating structure within the grating medium. The grating structure may have a plurality of holograms or sinusoidal volume gratings.

Optical system 400-*b* illustrates a light source 430-*b* where light 410-*b* enters the waveguide 420-*b*. In order for reflected light 410-*b* to be reflected towards the light coupling device 405-*b* and project replicated pupils 415-*c* and 415-*d*, light 410-*b* may propagate through the waveguide 420-*b* by total internal reflection. For example, light 410-*b* may propagate through waveguide 420-*b* and reflect between a downward mode direction and an upward mode direction. Light 410-*b* may be an example of light from one pixel (e.g., an image point) and have a corresponding width (e.g., the pupil width). In some examples, light 410-*b* may be an example of light from multiple pixels. In some cases, light 410-*b* may propagate down waveguide 420-*b* in one mode. In other examples, light 410-*b* may propagate down waveguide 420-*b* in multiple modes. That is, multiple reflections of light 410-*b* may occur along the surface of waveguide 420-*b*.

In some implementations, light homogenizing element 445 may disposed proximal to where light 410-*b* enters waveguide 420-*b*. Light 410-*b* may propagate through light homogenizing element 445, down waveguide medium 420-*b*, reflect off light coupling device 405-*b* and project substantially homogenous replicated pupils 415-*c* and 415-*d*. The light homogenizing element 445 may split the energy of the propagating light 410-*b*. In some cases, each portion of light 410-*b* may further propagate through the waveguide 420-*b* in both a first mode direction (e.g., a downward ray direction) and a second mode direction (e.g., an upward ray direction) different from the first mode direction. For example, each portion of light 410-*b* may reflect off light coupling device 405-*b* and project replicated pupils 415-*c* and 415-*d* with a uniform intensity profile. In some examples, the uniform intensity profile may represent partial homogenization. The uniform intensity profile at light coupling device 405-*b* may result in a partially spatially-homogeneous power distribution 440-*b*. In some substantially and fully homogenous replicated pupils cases, the intensity profile at light coupling device 405-*b* may result in a step-wise function power distribution where each portion of light may overlap and reflect off light coupling device 405-*b*. Partially spatially-homogeneous power distribution 440-*b* may narrow the PSF of an output beam associated with the replicated pupils 415-*c* and 415-*d* when compared to spatially-inhomogeneous power distribution 440-*a*.

FIG. 4B is merely illustrative and non-limiting. For example, a waveguide may have a first waveguide surface and a second waveguide surface parallel to the first waveguide surface. A partially reflective element (e.g., light homogenizing element 445) may be located between the first waveguide surface and the second waveguide surface. The partially reflective element may have a reflective axis parallel to a waveguide surface normal.

In some cases, the partially reflective element is configured to reflect light incident on the partially reflective element at a first reflectivity for a first set of incidence angles and to reflect light incident on the partially reflective element at a second reflectivity for a second set of incident angles. The first reflectivity may be different from the second reflectivity. In some cases, the partially reflective element is configured to reflect between 40% and 60% of light incident on the partially reflective element.

Additional examples and various implementations are contemplated using the light homogenizing techniques described herein.

Figure 5A:
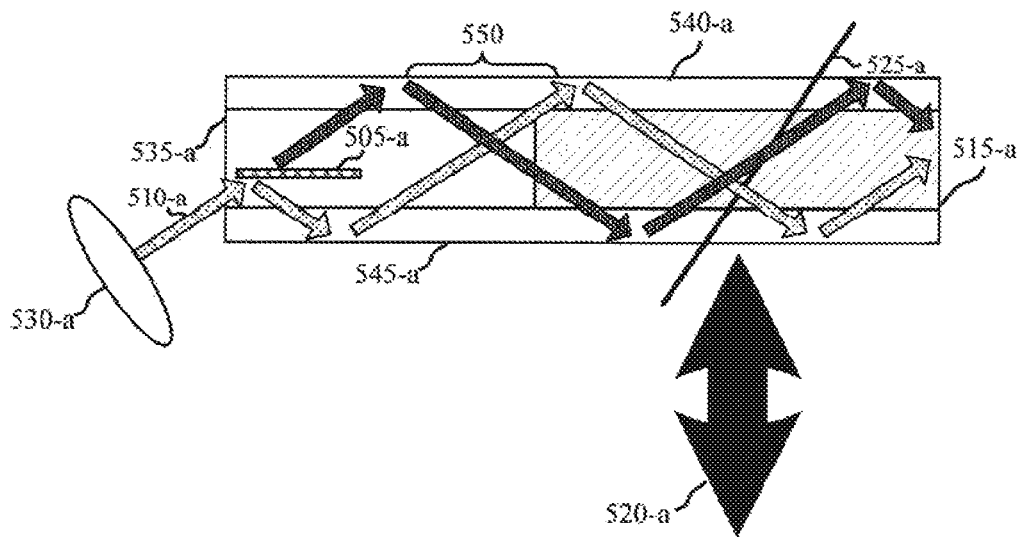
FIGS. 5A-5E illustrate an example of an illustrative optical system that supports light homogenization in accordance with some embodiments.

FIG. 5A illustrates an example of an optical system 500-*a* that supports light homogenization in accordance with various aspects of the present disclosure. Optical system 500-*a* may be utilized in an application such as, but not limited to, a head mounted display. The optical system 500-*a* may employ selective coupling to allow a partially reflective element of light homogenizing element 505-*a* to reflect light 510-*a* towards a specific location. The represented angles are internal angles relative to the surface normal of the grating medium 515-*a*, and that refraction at the grating medium 515-*a* and/or the substrate interface, as well as at the substrate air interface, is ignored for the purpose of illustration. Replicated pupil 520-*a* may project an image corresponding to reflective axis 525-*a*. Grating medium 515-*a* may include a grating structure. The grating structure may have a plurality of holograms or sinusoidal volume gratings.

Optical system 500-*a* illustrates a light source 530-*a* where light 510-*a* enters the waveguide medium 535-*a*. In order for light 510-*a* to be reflected and project replicated pupil 520-*a*, light 510-*a* may propagate through the waveguide medium 535-*a* by total internal reflection. For example, light 510-*a* may propagate through waveguide medium 535-*a* and reflect between a downward mode direction and an upward mode direction. Light 510-*a* may be an example of light from one pixel (e.g., an image point) and have a corresponding width (e.g., the pupil width). In some examples, light 510-*a* may be an example of light from multiple pixels.

Optical system 500-*a* may include a grating medium 515-*a* located at least partially within a waveguide medium 535-*a*. Grating medium 515-*a* may be implemented in a light coupling device (e.g., an input coupler, a cross coupler, or an output coupler) located within waveguide medium 535-*a*. In some cases, light homogenizing element 505-*a* may include a partially reflective element (e.g., with 50% reflectivity in some cases, but between 10% and 90% reflectivity in general) and may be located parallel to the first substrate 540-*a* (e.g., a first layer) and second substrate 545-*a* (e.g., a second layer) of waveguide medium 535-*a*. In other cases, light homogenizing element 505-*a* may include a partially reflective element (e.g., between 33% and 67% reflectivity in some cases and between 10% and 90% reflectivity in other cases). In some examples, the reflectivity of the partially reflective element may be based on a thickness of the waveguide and waveguide components (e.g., substrates, grating media, etc.). For example, a waveguide with a total thickness of 200 microns may be optimized with a partially reflective element having approximately 33% reflectivity, whereas a waveguide with a total thickness of 2 mm may be optimized with a partially reflective element having approximately 50% reflectivity. In some embodiments, a partially reflective element may have between 10% and 90% reflectivity.

The partially reflective element of light homogenizing element 505-*a* may be a metallic or dielectric material. A portion (e.g., half) of the incident light 510-*a* may refract or propagate through the partially reflective element and another portion of light 510-*a* may reflect off of the partially reflective element. In some cases, a first and second partially reflective plate of light homogenizing element 505-*a* may form a baffle. That is, the first partially reflective plate may be parallel and at least partially overlap the second partially reflective plate. In some examples, the first partially reflective plate may reflect light 510-*a* (e.g., a first set of incident angles) and the second partially reflective plate may reflect light 510-*a* (e.g., a second set of incident angles).

Reflectivity of the light homogenizing element 505-*a* may be spatially variable. For example, reflectivity of the light homogenizing element 505-*a* may vary throughout a length of the light homogenizing element 505-*a*. In some examples, the spatially variable light homogenizing element 505-*a* may vary from 50% to 0% reflectivity over a longitudinal distance of 2 mm. In other examples, the spatially variable light homogenizing element 505-*a* may vary from 0% to 50% to 0% reflectivity over a longitudinal distance of 2 mm. In some cases, light homogenizing element 505-*a* may have a center portion with a constant 50% reflectivity. The spatially variable light homogenizing element 505-*a* may also selectively reflect propagating light 510-*a* having a particular range of incidence angles with respect to surface normal of the waveguide.

FIG. 5A is merely illustrative and non-limiting. For example, a waveguide may have a first waveguide surface and a second waveguide surface parallel to the first waveguide surface. A partially reflective element (e.g., light homogenizing element 505-*a*) may be located between the first waveguide surface and the second waveguide surface. The partially reflective element may have a reflective axis parallel to a waveguide surface normal.

In some cases, the partially reflective element comprises a partially reflective plate disposed within the waveguide. The partially reflective plate may comprise a plate surface parallel to the first waveguide surface. In some cases, the partially reflective element comprises a first partially reflective plate and a second partially reflective plate disposed within the waveguide. Each of the first and second partially reflective plates may comprise a plate surface parallel to the first waveguide surface. Each of the first and second partially reflective plates may be configured to reflect 10% to 90% of light incident on a respective one of the first and second partially reflective plates.

Additional examples and various implementations are contemplated using the light homogenizing techniques described herein.

Figure 5B:
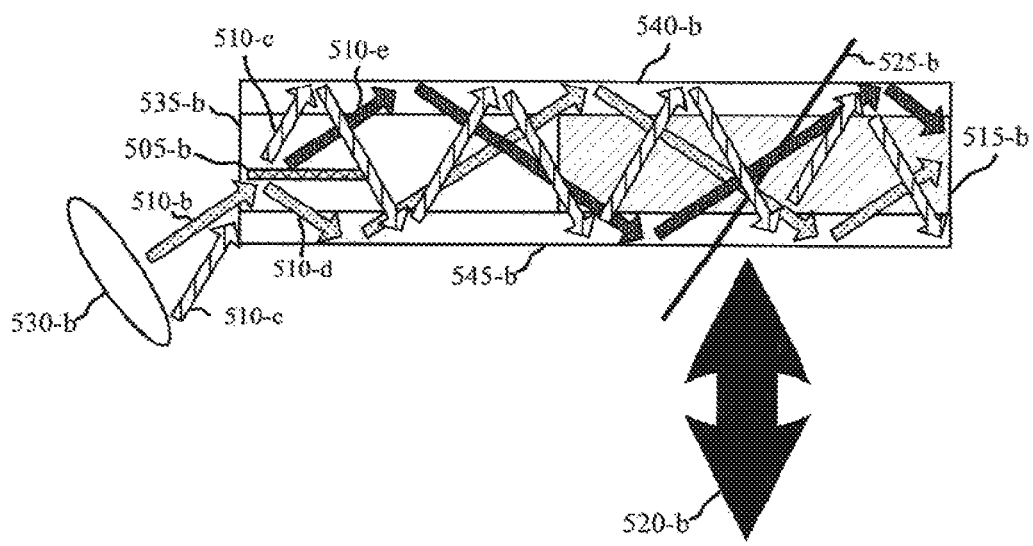

FIG. 5B illustrates a diagram of an optical system 500-*b* incorporating light homogenization. Optical system 500-*b* may be utilized in an application such as, but not limited to, a head mounted display. The optical system 500-*b* may employ selective coupling to allow a partially reflective element of light homogenizing element 505-*b* to reflect light 510-*b* towards a specific location. Refraction at the grating medium 515-*b* substrate interface, as well as at the substrate air interface, is ignored for the purpose of illustration in FIG. 5B. Replicated pupil 520-*b* may project an image corresponding to reflective axis 525-*b*. Grating medium 515-*b* may include a grating structure. The grating structure may have a plurality of holograms or sinusoidal volume gratings.

Optical system 500-*b* illustrates a light source 530-*b* where light 510-*b* and 510-*c* enters the waveguide medium 535-*b*. In order for light 510-*b* and 510-*c* to be reflected and project replicated pupil 520-*b*, light 510-*b* and 510-*c* may propagate through the waveguide medium 535-*b* by total internal reflection. For example, light 510-*b* and 510-*c* may propagate through waveguide medium 535-*b* and reflect between a downward mode direction and an upward mode direction. Based on incidence angle, light 510-*b* may be reflected by light homogenizing element 505-*b* whereas light 510-*c* is not reflected by light homogenizing element 505-*b*. Light 510-*b* and 510-*c* may be an example of light from one pixel (e.g., an image point) and have a corresponding width (e.g., the pupil width). In some examples, light 510-*b* and 510-*c* may each be an example of light from multiple pixels.

FIG. 5B is merely illustrative and non-limiting. For example, a waveguide may have a first waveguide surface and a second waveguide surface parallel to the first waveguide surface. A partially reflective element (e.g., light homogenizing element 505-*b*) may be located between the first waveguide surface and the second waveguide surface. The partially reflective element may have a reflective axis parallel to a waveguide surface normal.

Additionally or alternatively, the waveguide may comprise a first layer (e.g., first substrate 540-*b*) having parallel plane surfaces and a second layer (e.g., waveguide medium 535-*b*) having parallel plane surfaces. An interior plane surface of the parallel plane surfaces of the first layer may abut an interior plane surface of the parallel plane surfaces of the second layer waveguide. In some examples, the first waveguide surface may be a plane surface of the first layer opposite the interior plane surface of the parallel plane surfaces of the first layer, and the second waveguide surface may be a plane surface of the second layer opposite the interior plane surface of the parallel plane surfaces of the second layer. In some cases, the first layer has an index of refraction different from the second layer. In these cases, the partially reflective element may be a boundary condition associated with the first layer and the second layer.

Additional examples and various implementations are contemplated using the light homogenizing techniques described herein.

Figure 5C:
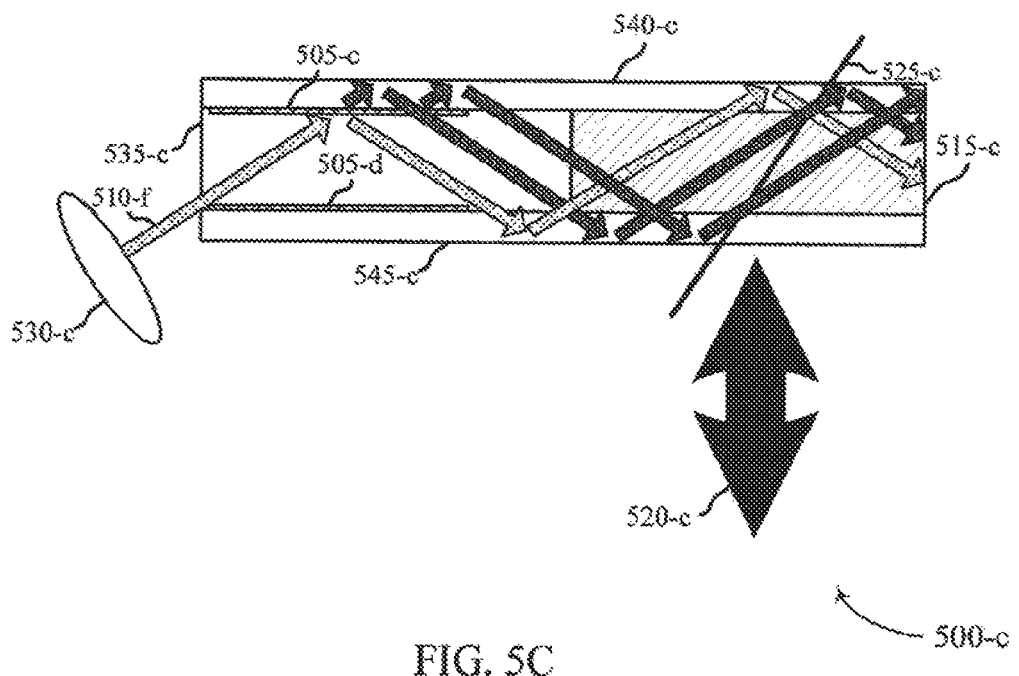

FIG. 5C illustrates a diagram of an optical system 500-*c* incorporating light homogenization. Optical system 500-*c* may be utilized in an application such as, but not limited to, a head mounted display. The optical system 500-*c* may employ selective coupling to allow a partially reflective element of light homogenizing element 505-*c* to reflect light

510-*f* towards a specific location. The represented angles are internal angles relative to the surface normal of the grating medium 515-*c*, and that refraction at the grating medium 515-*c* and/or the substrate interface, as well as at the substrate air interface, is ignored for the purpose of illustration. Replicated pupil 520-*c* may project an image corresponding to reflective axis 525-*c*. Grating medium 515-*c* may include a grating structure. The grating structure may have a plurality of holograms or sinusoidal volume gratings.

Optical system 500-*c* illustrates a light source 530-*c* where light 510-*f* enters the waveguide medium 535-*c*. In order for reflected light 510-*f* to be reflected and project replicated pupil 520-*c*, light 510-*f* may propagate through the waveguide medium 535-*c* by total internal reflection. For example, light 510-*f* may propagate through waveguide medium 535-*c* and reflect between a downward mode direction and an upward mode direction. Light 510-*f* may be an example of light from one pixel (e.g., an image point) and have a corresponding width (e.g., the pupil width). In some examples, light 510-*c* may be an example of light from multiple pixels.

Optical system 500-*c* may include a grating medium 515-*c* located at least partially within a waveguide medium 535-*c*. Grating medium 515-*c* may be implemented in a light coupling device (e.g., an input coupler, a cross coupler, or an output coupler) located within waveguide medium 535-*c*. In some implementations, a light homogenizing element 505-*c* may be located at the bottom interface of first substrate 540-*c* and light homogenizing element 505-*d* may be located at the top interface of second substrate 545-*c*. In some cases, light homogenizing elements 505-*c* and 505-*d* may include a partially reflective element (e.g., with 50% reflectivity). For example, multiple partially reflective elements of light homogenizing element 505-*c* and 505-*d* may be located in parallel at the bottom interface of first substrate 540-*c* and the top interface of second substrate 545-*c*, respectively.

FIG. 5C is merely illustrative and non-limiting. For example, a waveguide may have a first waveguide surface and a second waveguide surface parallel to the first waveguide surface. A partially reflective element (e.g., one or both of light homogenizing element 505-*c* and light homogenizing element 505-*d*) may be located between the first waveguide surface and the second waveguide surface. The partially reflective element may have a reflective axis parallel to a waveguide surface normal.

Additionally or alternatively, the waveguide may comprise a first layer (e.g., first substrate 540-*c*) having parallel plane surfaces and a second layer (e.g., waveguide medium 535-*c*) having parallel plane surfaces. An interior plane surface of the parallel plane surfaces of the first layer may abut an interior plane surface of the parallel plane surfaces of the second layer waveguide. In some examples, the first waveguide surface may be a plane surface of the first layer opposite the interior plane surface of the parallel plane surfaces of the first layer, and the second waveguide surface may be a plane surface of the second layer opposite the interior plane surface of the parallel plane surfaces of the second layer. In some cases, the first layer and the second layer have matched indices of refraction. In these cases, the partially reflective element may be a partially reflective coating (e.g., light homogenizing element 505-*c*) disposed on one or both of the interior plane surface of the parallel plane surfaces of the first layer or the interior plane surface of the parallel plane surfaces of the second layer.

Additionally or alternatively, the waveguide may comprise a first layer (e.g., second substrate 545-*c*) having parallel plane surfaces and a second layer (e.g., waveguide medium 535-*c*) having parallel plane surfaces. An interior plane surface of the parallel plane surfaces of the first layer may abut an interior plane surface of the parallel plane surfaces of the second layer waveguide. In some examples, the first waveguide surface may be a plane surface of the first layer opposite the interior plane surface of the parallel plane surfaces of the first layer, and the second waveguide surface may be a plane surface of the second layer opposite the interior plane surface of the parallel plane surfaces of the second layer. In some cases, the first layer and the second layer have matched indices of refraction. In these cases, the partially reflective element may be a partially reflective coating (e.g., light homogenizing element 505-*d*) disposed on one or both of the interior plane surface of the parallel plane surfaces of the first layer or the interior plane surface of the parallel plane surfaces of the second layer. The partially reflective coating may comprise a metallic or dielectric material.

Additional examples and various implementations are contemplated using the light homogenizing techniques described herein.

Figure 5D:
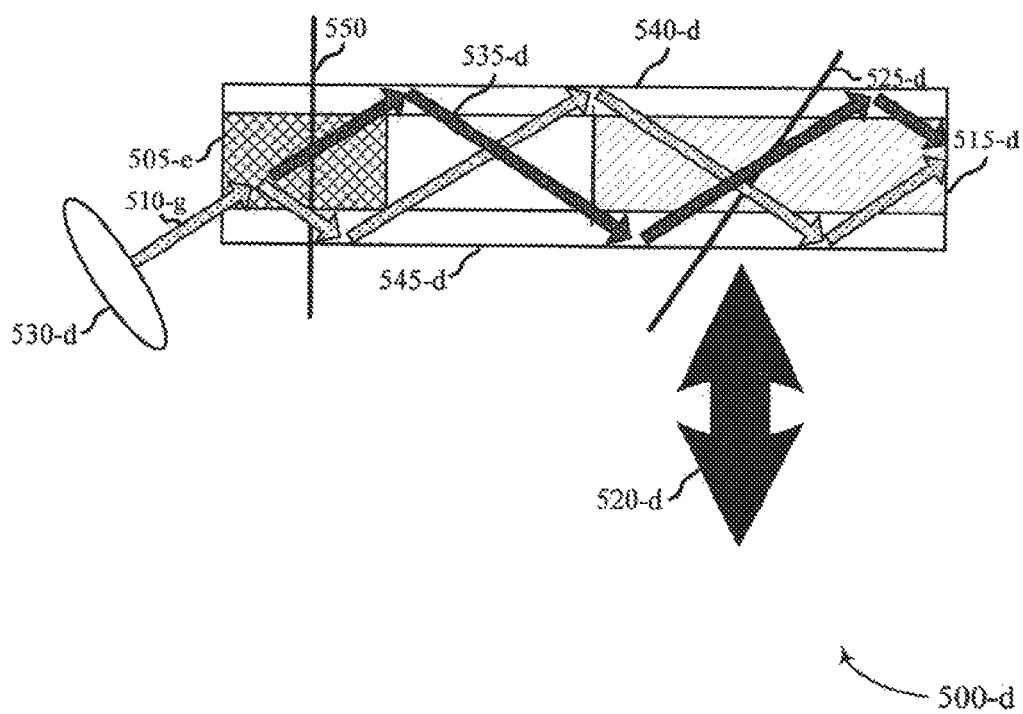

FIG. 5D illustrates a diagram of an optical system 500-*d* incorporating light homogenization. Optical system 500-*d* may be utilized in an application such as, but not limited to, a head mounted display. The optical system 500-*d* may employ selective coupling to allow a partially reflective element of light homogenizing element 505-*e* to reflect light towards a specific location Refraction at the grating medium the substrate interface, as well as at the substrate air interface, is ignored for the purpose of illustration in FIG. 5D. Replicated pupil 520-*d* may project an image corresponding to reflective axis 525-*d*. Grating medium 515-*d* may include a grating structure. The grating structure may have a plurality of holograms or sinusoidal volume gratings.

Optical system 500-*d* illustrates a light source 530-*d* where light 510-*g* enters the waveguide medium 535-*d*. In order for light 510-*g* to be reflected and project replicated pupil 520-*d*, light 510-*g* may propagate through the waveguide medium 535-*d* by total internal reflection. For example, light 510-*g* may propagate through waveguide medium 535-*c* and reflect between a downward mode direction and an upward mode direction. Light 510-*g* may be an example of light from one pixel (e.g., an image point) and have a corresponding width (e.g., the pupil width). In some examples, light 510-*g* may be an example of light from multiple pixels.

Optical system 500-*d* may include a grating medium 515-*d* located at least partially within a waveguide medium 535-*d*. Grating medium 515-*d* may be implemented in a light coupling device (e.g., an input coupler, a cross coupler, or an output coupler) located within waveguide medium 535-*d*. In some cases, light homogenizing element 505-*e* may comprise a skew mirror with a light homogenizing reflective axis 550 parallel to the surface of waveguide medium 535-*d*. In some cases, the skew mirror may be selectively reflective based at least in part on an angle of incidence associated with light 510-*g* incident on or propagating through the skew mirror. Light 510-*g* including a first set of ray angles (e.g., 65°-77° absolute angle with respect to surface normal) may have a higher reflectivity (e.g., 50% reflectivity), whereas light 510-*g* including a second set of ray angles (e.g., 49°-57° absolute angle with respect to surface normal) may have lower reflectivity (e.g., 25% reflectivity). For example, holograms configured to reflect light having angles of incidence within a first range (e.g., 65°-77° absolute angle with respect to surface normal) may be recorded stronger. In some cases, the skew mirror may be configured to selectively reflect light 510-g incident on or propagating through the skew mirror in two dimensions.

Light homogenizing element 505-e may further include a grating medium and more than one grating structures within the grating medium. The grating structures may include a plurality of holograms or sinusoidal volume gratings. The grating structures may reflect light 510-g with a first wavelength about a reflective axis offset from a surface normal of the grating structure at a first set of incident angles and may reflect light 510-g with a second wavelength about a reflective axis offset from a surface normal of the grating structure at a second set of incident angles. Each grating structure may include a different reflective axis offset from the normal of the corresponding grating structure.

FIG. 5D is merely illustrative and non-limiting. For example, a waveguide may have a first waveguide surface and a second waveguide surface parallel to the first waveguide surface. A partially reflective element (e.g., light homogenizing element 505-e) may be located between the first waveguide surface and the second waveguide surface. The partially reflective element may have a reflective axis parallel to a waveguide surface normal.

Additionally or alternatively, the waveguide may comprise a first layer (e.g., first substrate 540-d) having parallel plane surfaces and a second layer (e.g., waveguide medium 535-d) having parallel plane surfaces. An interior plane surface of the parallel plane surfaces of the first layer may abut an interior plane surface of the parallel plane surfaces of the second layer waveguide. In some examples, the first waveguide surface may be a plane surface of the first layer opposite the interior plane surface of the parallel plane surfaces of the first layer, and the second waveguide surface may be a plane surface of the second layer opposite the interior plane surface of the parallel plane surfaces of the second layer.

In some examples, a light coupling device may be disposed within at least one of the first layer or the second layer of the waveguide. The light coupling device may comprise a grating medium (e.g., grating medium 515-d), a first grating structure within the grating medium, and a second grating structure within the grating medium. The first grating structure may be configured to reflect light of a wavelength about a first reflective axis (e.g., reflective axis 525-d) offset from the waveguide surface normal at a first incidence angle. The second grating structure may be configured to reflect light of the wavelength about a second reflective axis offset from the waveguide surface normal at a second incidence angle different from the first incidence angle. In some cases, the first reflective axis and second reflective axis are substantially parallel.

In some cases, at least one of the first grating structure or the second grating structure comprises a hologram (e.g., a volume-phase hologram). In some cases, at least one of the first grating structure or the second grating structure comprises a non-holographic diffractive optical element. The non-holographic diffractive optical element may include louvered mirrors or liquid crystal gratings, for example.

Additionally or alternatively, the partially reflective element may comprise a grating medium (e.g., light homogenizing element 505-e), a first grating structure within the grating medium, and a second grating structure within the grating medium. The first grating structure may be configured to reflect light of a wavelength about a first reflective axis (e.g., light homogenizing reflective axis 550) parallel to the waveguide surface normal at a first incidence angle. The second grating structure may be configured to reflect light of the wavelength about a second reflective axis parallel to the waveguide surface normal at a second incidence angle different from the first incidence angle.

In some cases, at least one of the first grating structure or the second grating structure of the partially reflective element comprises a hologram (e.g., a volume-phase hologram). In some cases, at least one of the first grating structure or the second grating structure of the partially reflective element comprises a non-holographic diffractive optical element. The non-holographic diffractive optical element may include louvered mirrors or liquid crystal gratings, for example.

In some cases, the grating medium of the partially reflective element is configured to reflect between 10% and 90% of the light of the wavelength incident on the grating medium. In some cases, the each of the first incidence angle and the second incidence angle has a value between 65° and 77° with respect to the waveguide surface normal. In some cases, the grating medium of the partially reflective element is configured to allow a majority of light of the wavelength to pass through the grating medium at third incidence angle different from the first incidence angle and the second incidence angle. That is, a greater percentage of the light incident on the grating medium at third incidence angle may pass through the grating medium than the light incident on the grating medium at either the first incidence angle or second incidence angle. In some cases, the third incidence angle may be closer to a critical angle of the waveguide (e.g., approximately 41° in some implementations) than either of the first incidence angle or the second incidence angle. For example, the third incidence angle may have a value between 49° and 57° with respect to the waveguide surface normal.

Additional examples and various implementations are contemplated using the light homogenizing techniques described herein.

Figure 5E:
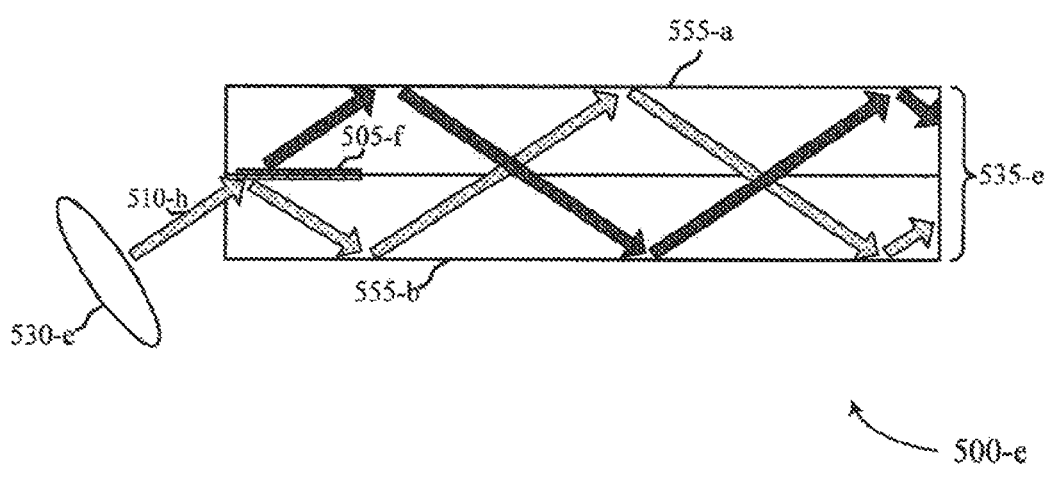

FIG. 5E illustrates a diagram of an optical system 500-e incorporating light homogenization. Optical system 500-e may be utilized in an application such as, but not limited to, a head mounted display. The optical system 500-e may employ selective coupling to allow a partially reflective element of light homogenizing element 505-f to reflect light towards a specific location. Optical system 500-e illustrates a light source 530-e where light 510-h enters the waveguide 535-e. For example, light 510-h may propagate through waveguide 535-e and reflect between a downward mode direction and an upward mode direction. Light 510-h may be an example of light from one pixel (e.g., an image point) and have a corresponding width (e.g., the pupil width). In some examples, light 510-h may be an example of light from multiple pixels.

In some examples, light homogenizing element 505-f may include a partially reflective element (e.g., with 50% reflectivity) in a waveguide 535-e without a recording medium layer. Waveguide 535-e may be formed by cementing two glass slabs of half the total thickness of the waveguide 535-e such that a partially reflective element is disposed between the two abutting surfaces top slab 555-a and bottom slab 555-b. In some cases, a partially reflective element may be a partially reflective coating applied to a surface of at least one of the two slabs. In some examples, light homogenizing element 505-f may be utilized with or disposed within a waveguide system that includes one or more coupler comprised of volume holograms. In other examples, light homogenizing element 505-f may be utilized with or disposed within a waveguide system that includes one or more coupler comprised of diffractive optical elements (DOEs), louvered mirrors, and/or liquid crystal gratings.

FIG. 5E is merely illustrative and non-limiting. For example, a waveguide may have a first waveguide surface and a second waveguide surface parallel to the first waveguide surface. A partially reflective element (e.g., light homogenizing element 505-f) may be located between the first waveguide surface and the second waveguide surface. The partially reflective element may have a reflective axis parallel to a waveguide surface normal.

Additionally or alternatively, the waveguide may comprise a first layer (e.g., first slab 555-a) having parallel plane surfaces and a second layer (e.g., second slab 555-b) having parallel plane surfaces. An interior plane surface of the parallel plane surfaces of the first layer may abut an interior plane surface of the parallel plane surfaces of the second layer waveguide. In some examples, the first waveguide surface may be a plane surface of the first layer opposite the interior plane surface of the parallel plane surfaces of the first layer, and the second waveguide surface may be a plane surface of the second layer opposite the interior plane surface of the parallel plane surfaces of the second layer. In some cases, the first layer and the second layer have matched indices of refraction. In these cases, the partially reflective element may be a partially reflective coating (e.g., light homogenizing element 505-f) disposed on one or both of the interior plane surface of the parallel plane surfaces of the first layer or the interior plane surface of the parallel plane surfaces of the second layer.

Additional examples and various implementations are contemplated using the light homogenizing techniques described herein.

Figure 6A:
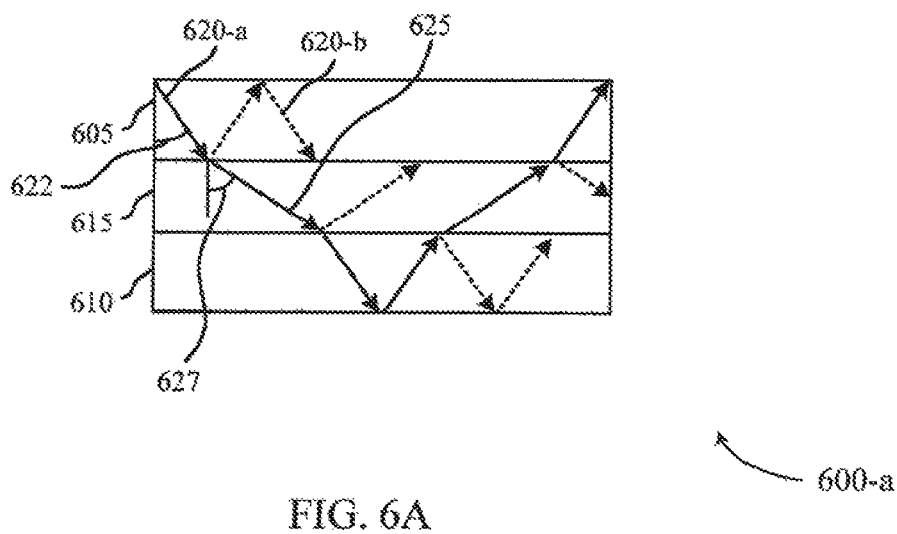
FIG. 6A illustrates an example of an illustrative system that supports light homogenization in accordance with some embodiments.

FIG. 6A illustrates an example system 600-a that supports light homogenization in accordance with various aspects of the present disclosure. System 600-a may include a first substrate 605, second substrate 610, and waveguide medium 615. Light 620-a may enter the first substrate 605 at an angle of incidence 622 with respect to the surface normal. Light 620-b may reflect off the bottom surface of the first substrate 605. Refracted light 625 may enter waveguide medium 615 at an angle of refraction 627 with respect to the surface normal.

In some examples, an index of refraction mismatch may be purposefully applied to a waveguide 615 for the purpose of homogenizing light. In some cases, an index of refraction mismatch may be configured between the first substrate 605 and the waveguide medium 615 and/or the second substrate 610 and the waveguide medium 615. For example, first substrate 605 and second substrate 610 may have an index of refraction of 1.83 and waveguide medium 615 may have an index of refraction of 1.53. Light at an angle of incidence of 54.5° with respect to surface normal incident on a boundary of the first substrate 605 and the waveguide medium 615 results in refracted light at the second angle of incidence of 77° a reflectivity of 0.26 associated with a reflected wave. A resulting replicated pupil period is 6.6 mm when the waveguide medium 615, top substrate 605, bottom substrate 610 are each 0.5 mm thick. By contrast, when the top substrate 605 and the bottom substrate 610 have an index of refraction of 1.53, light remains at an angle of 77° and the pupil replication period becomes 13.0 mm.

In some cases, increasing the index of refraction for first substrate 605 and second substrate 610 may cause a decrease in a pupil replication period. For example, TIR geometry and characteristics of optical elements in a waveguide may be configured to homogenize light. In other cases, increasing the index of refraction for first substrate 605 and second substrate 610 may not affect a pupil size of the waveguide. For example, a decrease in the pupil replication period with a same pupil size improves homogenization of the propagating light, particularly for light having angles of incidence close to the critical angle.

In some cases, system 600-a may include a grating medium (not shown) located at least partially within a waveguide medium 615. A grating medium may be implemented in a light coupling device (e.g., an input coupler, a cross coupler, or an output coupler) located within waveguide medium 615. In some examples, an index of refraction mismatch may be imposed on a portion of the first substrate 605 or second substrate 610 of waveguide medium 615. That is, the first substrate 605 and waveguide medium 615 may have matched indices of refraction, and the second substrate 610 and waveguide medium 615 may have different indices of refraction. For example, the index of refraction mismatch between the second substrate 610 and the waveguide medium 615 may cause a Fresnel reflection off the top surface of the second substrate 610. In some cases, TIR pupil geometry may improve homogenization by decreasing the pupil replication period and leaving the pupil size unchanged. In other examples, an index of reflection mismatch may produce reflections during hologram recording that impacts the recording of holograms.

FIG. 6A is merely illustrative and non-limiting. For example, a waveguide may have a first waveguide surface and a second waveguide surface parallel to the first waveguide surface. The waveguide may comprise a first layer (e.g., first substrate 605) having parallel plane surfaces and a second layer (e.g., waveguide medium 615) having parallel plane surfaces. An interior plane surface of the parallel plane surfaces of the first layer may abut an interior plane surface of the parallel plane surfaces of the second layer waveguide. In some examples, the first waveguide surface may be a plane surface of the first layer opposite the interior plane surface of the parallel plane surfaces of the first layer, and the second waveguide surface may be a plane surface of the second layer opposite the interior plane surface of the parallel plane surfaces of the second layer. In some cases, the first layer has an index of refraction different from the second layer. For example, the first layer may have an index of refraction higher than the second layer. In these cases, the partially reflective element may be a boundary condition associated with the first layer and the second layer. The partially reflective element may have a reflective axis parallel to a waveguide surface normal.

Additionally or alternatively, a waveguide may have a first waveguide surface and a second waveguide surface parallel to the first waveguide surface. The waveguide may comprise a first layer (e.g., bottom substrate 610) having parallel plane surfaces and a second layer (e.g., waveguide medium 615) having parallel plane surfaces. An interior plane surface of the parallel plane surfaces of the first layer may abut an interior plane surface of the parallel plane surfaces of the second layer waveguide. In some examples, the first waveguide surface may be a plane surface of the first layer opposite the interior plane surface of the parallel plane surfaces of the first layer, and the second waveguide surface may be a plane surface of the second layer opposite the interior plane surface of the parallel plane surfaces of the second layer. In some cases, the first layer has an index of refraction different from the second layer. For example, the first layer may have an index of refraction higher than the second layer. In these cases, the partially reflective element may be a boundary condition associated with the first layer and the second layer. The partially reflective element may have a reflective axis parallel to a waveguide surface normal.

Additional examples and various implementations are contemplated using the light homogenizing techniques described herein.

Figure 6B:
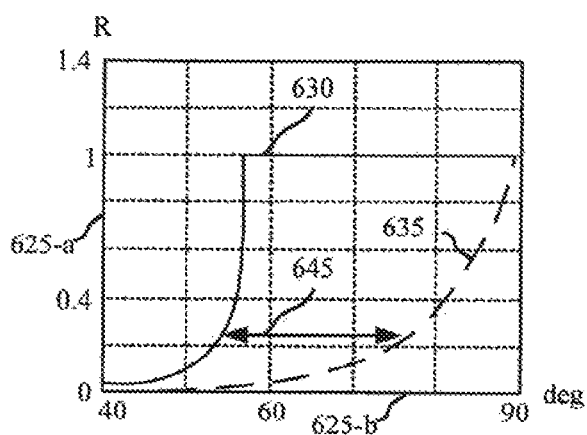
FIG. 6B illustrates an example of an illustrative plot that supports light homogenization in accordance with some embodiments.

FIG. 6B illustrates an example plot 600-b that supports light homogenization in accordance with various aspects of the present disclosure. Plot 600-b includes axis 625-a that may represent reflectivity and axis 625-b that may represent incidence angles. Plot 600-b may also include first plot line 630, second plot line 635, and difference segment 645.

First plot line 630 may represent the reflectivity a transverse electric (TE) polarized incident light wave over a range of incidence angles for a matched boundary condition (i.e., equal indices of refraction). In some examples, first plot line 630 may represent the reflectivity a transverse electric (TE) polarized incident light wave over a range of incidence angles for light traveling from the top substrate to the waveguide medium (i.e., from a medium with a higher index of refraction to a medium with a lower index of refraction).

In some examples, second plot line 635 may represents the reflectivity a TE polarized incident light wave over a range of incidence angles for a mismatched boundary condition (i.e., indices of refraction differ on opposite sides of the boundary). In other examples, second plot line 635 may represent the reflectivity a transverse electric (TE) polarized incident light wave over a range of incidence angles for light traveling from the waveguide medium to the second substrate 610 (i.e., from a medium with a lower index of refraction to a medium with a higher index of refraction).

Difference segment 645 may illustrate the difference associated with light at an incidence angle of 54.5° in $n_s$ and light at an incidence angle of 77° in $n_m$ (e.g., where $n_m$=1.53 and $n_s$=1.83). The reflectivity of the boundary in both directions is 0.26. The second plot line 635 may show reflectivity for a boundary condition associated with an index of refraction difference of 0.3. Light at an incidence angle of 77° may result in a reflectivity of 0.26. Thus, Fresnel reflections may be highest for light having large angles of incidence with respect to surface normal of the waveguide (e.g., propagating light having angles of incidence close to) 90°. Fresnel reflections caused by light having angles of incidence close to the critical angle will have little to no effect on improving homogenization of light in the waveguide.

Figure 7A:
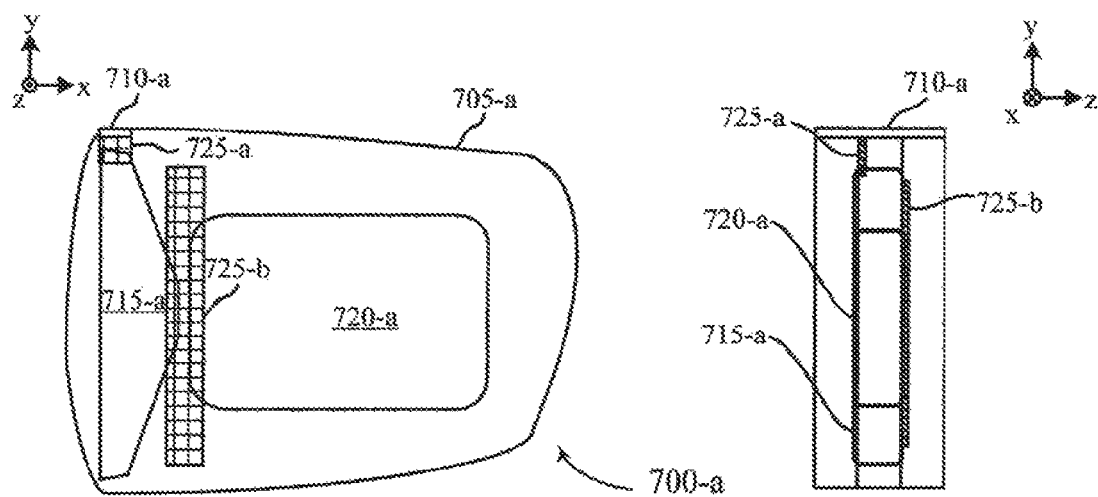
FIGS. 7A-7C illustrates an example of an illustrative optical lens that supports light homogenization in accordance with some embodiments.

FIG. 7A illustrates an example of an optical lens 700-a that supports light homogenization in accordance with various aspects of the present disclosure. The optical lens 700-a may include waveguide 705-a, light input section 710-a, first light coupling device 715-a (e.g., cross coupler), second light coupling device 720-a (e.g., output coupler), and light homogenizing elements 725-a and 725-b. Waveguide 705-a may also include another light coupling device (e.g., an input coupler); however, the input coupler is ignored for the purpose of illustration). Waveguide 705-a may include a first and second surface parallel to each other and a light receiving end proximal to the light input section 710-a and a light output end distal to the light input section 710-a.

In some examples, light homogenizing element 725-a may be located between light input section 710-a and first light coupling device 715-a. In other examples, light homogenizing element 720-b may be located between first light coupling device 715-a and second light coupling device 720-a. In some cases, light homogenizing element 725-a may be located between the input coupler (not shown) and first light coupling device 715-a. Light homogenizing elements 725-a or 725-b may be located throughout the entire waveguide 705-a. However, if light homogenizing elements 725-a and 725-b may be located throughout the entire waveguide 705-a, there may be issues with recording first light coupling device 715-a and second light coupling device 720-a. In some cases, light homogenizing elements 725-a and 725-b may or may not spatially overlap the first light coupling device 715-a and the second light coupling device 720-a. In some examples, light homogenizing element 725-a may or may not spatially overlap light input section 710-a.

In some cases, light homogenizing element 725-a may be configured to reflect and refract light in a first direction (e.g., light propagating in the y-axis direction) and light homogenizing element 725-b may be configured to reflect and refract light in a second direction (e.g., light propagating in the x-axis direction). In other examples, light homogenizing elements 725-a and 725-b may be two-dimensional such that the homogenizing element is configured to direct light in both a first direction (e.g., light propagating in the x-axis direction) and a second direction (e.g., light propagating in the y-axis direction or the z-axis direction).

FIG. 7A is merely illustrative and non-limiting. For example, a waveguide may have a first waveguide surface and a second waveguide surface parallel to the first waveguide surface. A partially reflective element (e.g., one of both of light homogenizing element 725-a and light homogenizing element 725-b) may be located between the first waveguide surface and the second waveguide surface. The partially reflective element may have a reflective axis parallel to a waveguide surface normal.

Additionally or alternatively, the waveguide may comprise a first layer having parallel plane surfaces and a second layer having parallel plane surfaces. An interior plane surface of the parallel plane surfaces of the first layer may abut an interior plane surface of the parallel plane surfaces of the second layer waveguide. In some examples, the first waveguide surface may be a plane surface of the first layer opposite the interior plane surface of the parallel plane surfaces of the first layer, and the second waveguide surface may be a plane surface of the second layer opposite the interior plane surface of the parallel plane surfaces of the second layer.

In some examples, the partially reflective element may be a partially reflective coating disposed on one or both of the interior plane surface of the parallel plane surfaces of the first layer or the interior plane surface of the parallel plane surfaces of the second layer.

In some examples, a light coupling device (e.g., one or both of light coupling device 715-a and light coupling device 720-a) may be disposed within at least one of the first layer or the second layer of the waveguide. The light coupling device may comprise a grating medium, a first grating structure within the grating medium, and a second grating structure within the grating medium. The first grating structure may be configured to reflect light of a wavelength about a first reflective axis offset from the waveguide surface normal at a first incidence angle. The second grating structure may be configured to reflect light of the wavelength about a second reflective axis offset from the waveguide surface normal at a second incidence angle different from the first incidence angle. In some cases, the first reflective axis and second reflective axis are substantially parallel.

In some cases, at least one of the first grating structure or the second grating structure comprises a hologram (e.g., a volume-phase hologram). In some cases, at least one of the first grating structure or the second grating structure comprises a non-holographic diffractive optical element. The non-holographic diffractive optical element may include louvered mirrors or liquid crystal gratings, for example.

Additional examples and various implementations are contemplated using the light homogenizing techniques described herein.

Figure 7B:
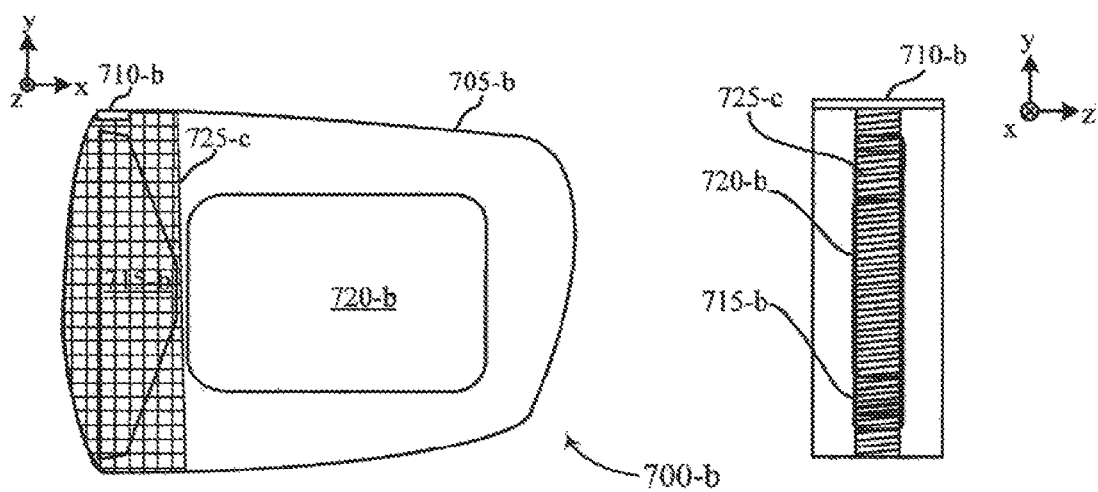

FIG. 7B illustrates an example of an optical lens 700-*b* that supports light homogenization in accordance with various aspects of the present disclosure. The optical lens 700-*b* may include waveguide 705-*b*, light input section 710-*b*, first light coupling device 715-*b* (e.g., cross coupler), second light coupling device 720-*b* (e.g., output coupler), and light homogenizing element 725-*c*. Pupil expander may also include another light coupling device (e.g., an input coupler); however, the input coupler is ignored for the purpose of illustration). Waveguide 705-*b* may include a first and second surface parallel to each other and a light receiving end proximal to the light input section 710-*b* and a light output end distal to the light input section 710-*b*. In some cases, light homogenizing element 725-*c* may spatially overlap the first light coupling device 715-*b*. In some examples, light homogenizing element 725-*c* may or may not spatially overlap light input section 710-*b*.

FIG. 7B is merely illustrative and non-limiting. For example, a waveguide may have a first waveguide surface and a second waveguide surface parallel to the first waveguide surface. A partially reflective element (e.g., light homogenizing element 725-*c*) may be located between the first waveguide surface and the second waveguide surface. The partially reflective element may have a reflective axis parallel to a waveguide surface normal.

Additionally or alternatively, the waveguide may comprise a first layer having parallel plane surfaces and a second layer having parallel plane surfaces. An interior plane surface of the parallel plane surfaces of the first layer may abut an interior plane surface of the parallel plane surfaces of the second layer waveguide. In some examples, the first waveguide surface may be a plane surface of the first layer opposite the interior plane surface of the parallel plane surfaces of the first layer, and the second waveguide surface may be a plane surface of the second layer opposite the interior plane surface of the parallel plane surfaces of the second layer.

Additionally or alternatively, the partially reflective element may comprise a grating medium (e.g., light homogenizing element 725-*c*), a first grating structure within the grating medium, and a second grating structure within the grating medium. The first grating structure may be configured to reflect light of a wavelength about a first reflective axis parallel to the waveguide surface normal at a first incidence angle. The second grating structure may be configured to reflect light of the wavelength about a second reflective axis parallel to the waveguide surface normal at a second incidence angle different from the first incidence angle.

In some cases, at least one of the first grating structure or the second grating structure of the partially reflective element comprises a hologram (e.g., a volume-phase hologram). In some cases, at least one of the first grating structure or the second grating structure of the partially reflective element comprises a non-holographic diffractive optical element.

In some examples, a light coupling device (e.g., one or both of light coupling device 715-*b* and light coupling device 720-*b*) may be disposed within at least one of the first layer or the second layer of the waveguide. The light coupling device may comprise a grating medium, a first grating structure within the grating medium, and a second grating structure within the grating medium. The first grating structure may be configured to reflect light of a wavelength about a first reflective axis offset from the waveguide surface normal at a first incidence angle. The second grating structure may be configured to reflect light of the wavelength about a second reflective axis offset from the waveguide surface normal at a second incidence angle different from the first incidence angle. In some cases, the first reflective axis and second reflective axis are substantially parallel.

In some cases, at least one of the first grating structure or the second grating structure comprises a hologram (e.g., a volume-phase hologram). In some cases, at least one of the first grating structure or the second grating structure comprises a non-holographic diffractive optical element. The non-holographic diffractive optical element may include louvered mirrors or liquid crystal gratings, for example.

In some cases, the partially reflective element spatially overlaps the grating medium. For example, at least one hologram of multiple holograms in a grating structure of the partially reflective element (e.g., light homogenizing element 725-*c*) may at least partially spatially overlap at least one hologram of multiple holograms in a grating structure of the light coupling device (e.g., light coupling device 715-*b*). For example, spatially overlapping holograms overlap with respect to the space occupied or volume shared by two holograms in a contiguous grating medium (e.g., two spatially overlapping holograms share or coexist in at least a portion of the same space or volume within the grating medium or mediums). In this manner, at least some of the varying refractive index properties and associated fringe patterns of a first hologram will occupy the same space or volume of (and be superimposed or intermingled with) at least some of the varying refractive index properties and associated fringe patterns of a second hologram within the grating medium or mediums.

Additional examples and various implementations are contemplated using the light homogenizing techniques described herein.

Figure 7C:
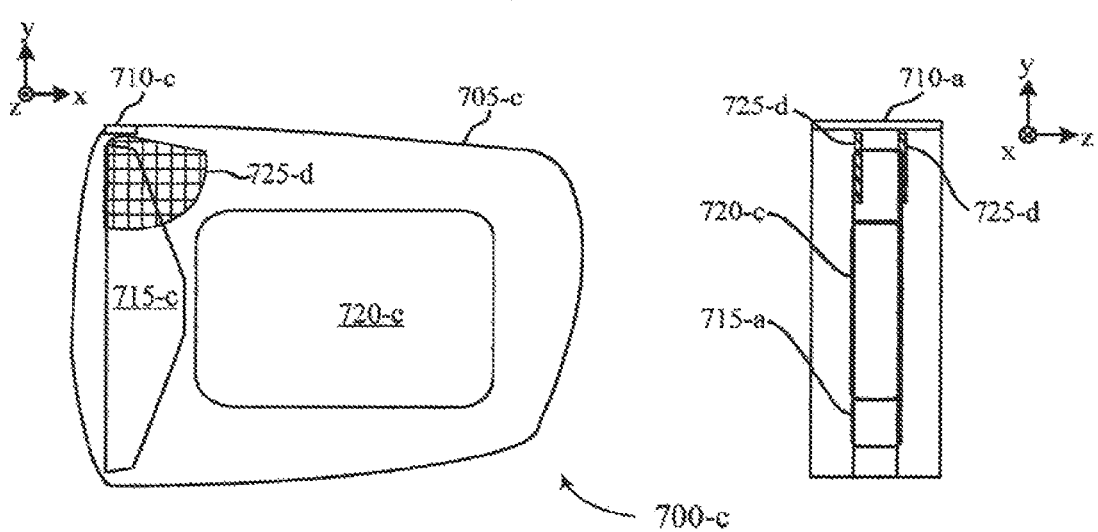

FIG. 7C illustrates an example of an optical lens 700-*c* that supports light homogenization in accordance with various aspects of the present disclosure. The optical lens 700-*c* may include waveguide 705-*c*, light input section 710-*c*, first light coupling device 715-*c* (e.g., cross coupler), second light coupling device 720-*c* (e.g., output coupler), and light homogenizing element 725-*d*. Pupil expander may also include another light coupling device (e.g., an input coupler); however, the input coupler is ignored for the purpose of illustration). Waveguide 705-*c* may include a first and second surface parallel to each other and a light receiving end proximal to the light input section 710-*c* and a light output end distal to the light input section 710-*c*. In some cases, light homogenizing element 725-*d* may include a radial composition and spatially overlap a portion of first light coupling device 715-*c*. In some examples, light homogenizing element 725-*d* may or may not spatially overlap light input section 710-*c*.

FIG. 7C is merely illustrative and non-limiting. For example, a waveguide may have a first waveguide surface and a second waveguide surface parallel to the first waveguide surface. A partially reflective element (e.g., light homogenizing element 725-*d*) may be located between the first waveguide surface and the second waveguide surface. The partially reflective element may have a reflective axis parallel to a waveguide surface normal.

Additionally or alternatively, the waveguide may comprise a first layer having parallel plane surfaces and a second layer having parallel plane surfaces. An interior plane surface of the parallel plane surfaces of the first layer may abut an interior plane surface of the parallel plane surfaces of the second layer waveguide. In some examples, the first waveguide surface may be a plane surface of the first layer opposite the interior plane surface of the parallel plane surfaces of the first layer, and the second waveguide surface may be a plane surface of the second layer opposite the interior plane surface of the parallel plane surfaces of the second layer.

In some examples, the partially reflective element may be a partially reflective coating disposed on one or both of the interior plane surface of the parallel plane surfaces of the first layer or the interior plane surface of the parallel plane surfaces of the second layer.

In some examples, a light coupling device (e.g., one or both of light coupling device 715-*c* and light coupling device 720-*c*) may be disposed within at least one of the first layer or the second layer of the waveguide. The light coupling device may comprise a grating medium, a first grating structure within the grating medium, and a second grating structure within the grating medium. The first grating structure may be configured to reflect light of a wavelength about a first reflective axis offset from the waveguide surface normal at a first incidence angle. The second grating structure may be configured to reflect light of the wavelength about a second reflective axis offset from the waveguide surface normal at a second incidence angle different from the first incidence angle. In some cases, the first reflective axis and second reflective axis are substantially parallel.

In some cases, at least one of the first grating structure or the second grating structure comprises a hologram (e.g., a volume-phase hologram). In some cases, at least one of the first grating structure or the second grating structure comprises a non-holographic diffractive optical element. The non-holographic diffractive optical element may include louvered mirrors or liquid crystal gratings, for example.

In some cases, the partially reflective element may at least partially overlap the grating medium of the light coupling device (e.g., light coupling device 715-*c*) in a direction orthogonal to a plane of the first waveguide surface.

Additional examples and various implementations are contemplated using the light homogenizing techniques described herein.

Figure 8:
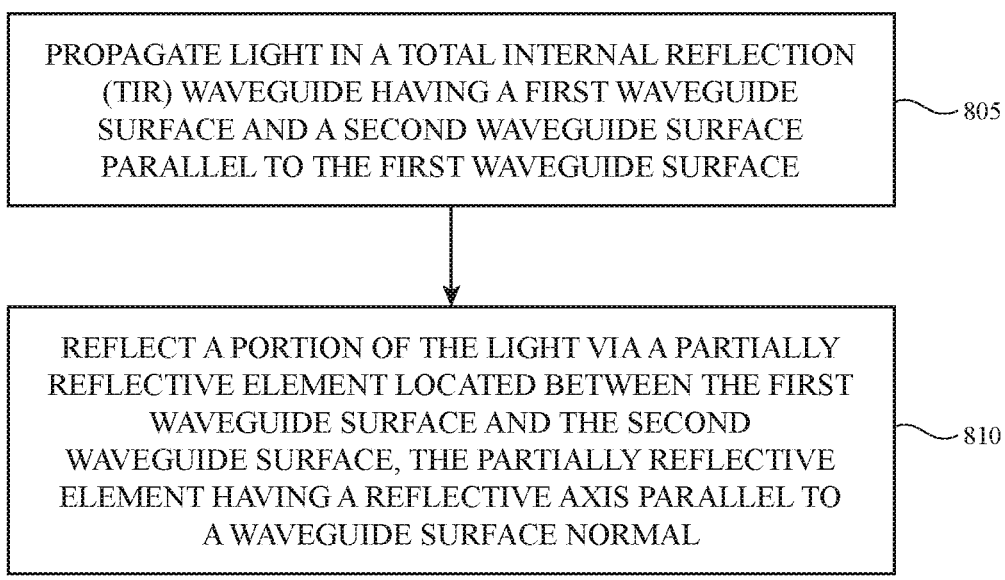
FIG. 8 shows an illustrative method for light homogenization in accordance with some embodiments.

FIG. 8 shows a flowchart illustrating a method 800 for light homogenization in accordance with aspects of the present disclosure. The operations of method 800 may be implemented by a waveguide or its components as described herein. For example, the operations of method 800 may be performed by a waveguide as described with reference to FIGS. 4 through 7.

At block 805 the waveguide may propagate light in a TIR waveguide having a first waveguide surface and a second waveguide surface parallel to the first waveguide surface. The operations of block 805 may be performed according to the methods described herein. In certain examples, aspects of the operations of block 805 may be performed by a waveguide as described with reference to FIGS. 4 through 7.

At block 810 the waveguide may reflect a portion of the light via a partially reflective element located between the first waveguide surface and the second waveguide surface, the partially reflective element having a reflective axis parallel to a waveguide surface normal. The operations of block 810 may be performed according to the methods described herein. In certain examples, aspects of the operations of block 810 may be performed by a partially reflective element as described with reference to FIGS. 4 through 7.

In the examples described above in connection with FIGS. 4-8, light homogenization is performed within the waveguide. It may sometimes be desirable to be able to perform light homogenization at a location outside of the waveguide and external to the grating medium. If desired, the structures and methods described above in connection with FIGS. 4-8 may be performed using light homogenization structures located on a or at a surface (e.g., an exterior surface) of the waveguide (e.g., external to the waveguide and separate from a grating medium used to perform redirection operations such as input coupling, output coupling, or cross-coupling).

Figure 9:
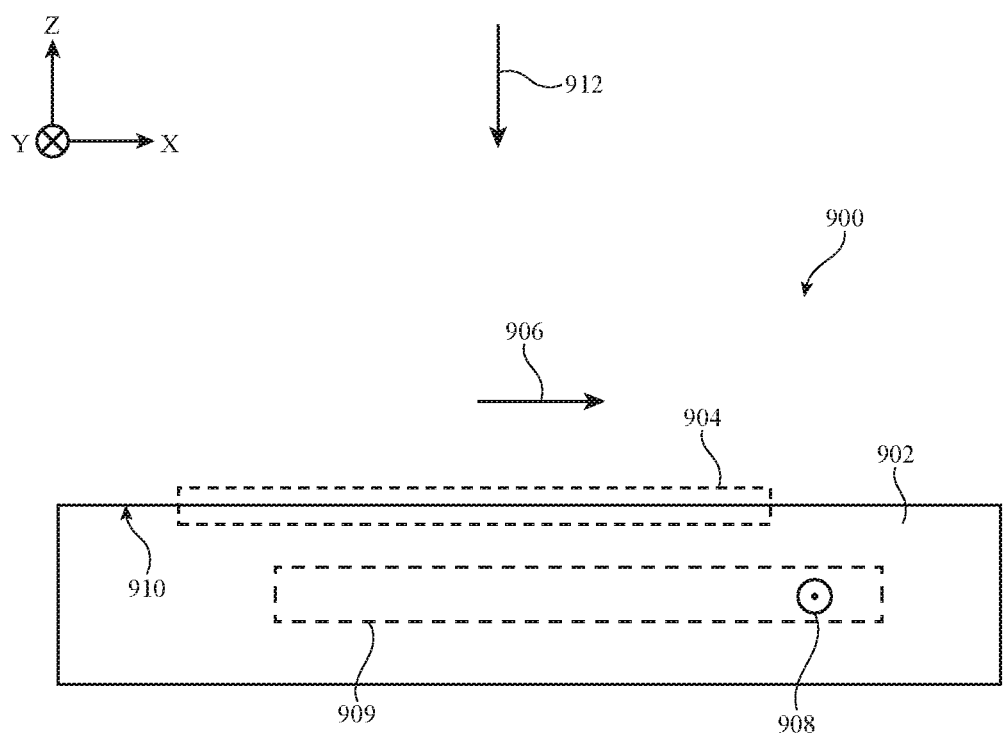
FIG. 9 is a side view of an illustrative optical system that includes longitudinal light homogenizing structures formed over a waveguide in accordance with some embodiments.

FIG. 9 is a side-view showing how the light homogenization structures may homogenize light for a waveguide (e.g., waveguide 420 of FIG. 4, the substrates and grating media shown in FIGS. 5-7, etc.). As shown in FIG. 9, system 900 may include light homogenization structures 904 mounted to surface 910 of waveguide 902 (e.g., external to waveguide 902). Surface 910 may be, for example, the surface of the top waveguide substrate for waveguide 902 (e.g., a grating medium may be sandwiched between top and bottom waveguide substrates for waveguide 902). The example in which structure 902 is formed using a waveguide is merely described herein as an example and, if desired, structure 902 may be any desired substrate having a grating medium with holographic elements (e.g., for performing input coupling, output coupling, and/or cross-coupling).

Light homogenization structures 904 may be implemented using any of the systems described above in connection with FIGS. 4-7 (e.g., system 400 of FIG. 4, system 500 of FIG. 5, system 600 of FIG. 6, and/or system 700 of FIG. 7 may be implemented within light homogenization structures 904 of FIG. 9). Waveguide 902 may have lateral surfaces extending in the two-dimensional X-Y plane. Waveguide 902 may have a longitudinal dimension (parallel to the X axis) and a perpendicular lateral dimension (parallel to the Y axis). As shown in FIG. 9, light homogenization structures 904 may homogenize light along the longitudinal dimension, as shown by arrow 906. Light homogenization structures 904 may also couple the light downward into a cross-coupler 909 within waveguide 902 and/or to a cross-coupler external to waveguide 902 (e.g., a cross coupler formed using skew mirrors or other optical elements). Cross-coupler 909 may be formed using gratings in a grating medium sandwiched between the top and bottom waveguide substrates of waveguide 902, may be formed at a surface of the waveguide, or may be formed external to the waveguide and interposed between structures 904 and waveguide 902. Cross-coupler 909 may serve to homogenize the light homogenized by structures 904 in the longitudinal dimension in the lateral dimension, as shown by arrow 908 (out of the page). Collectively, light homogenization structures 904 and the cross-coupler may serve to homogenize input light 908 across the two-dimensional lateral area of the waveguide (e.g., in two dimensions along the longitudinal and lateral axes).

Figure 10A:
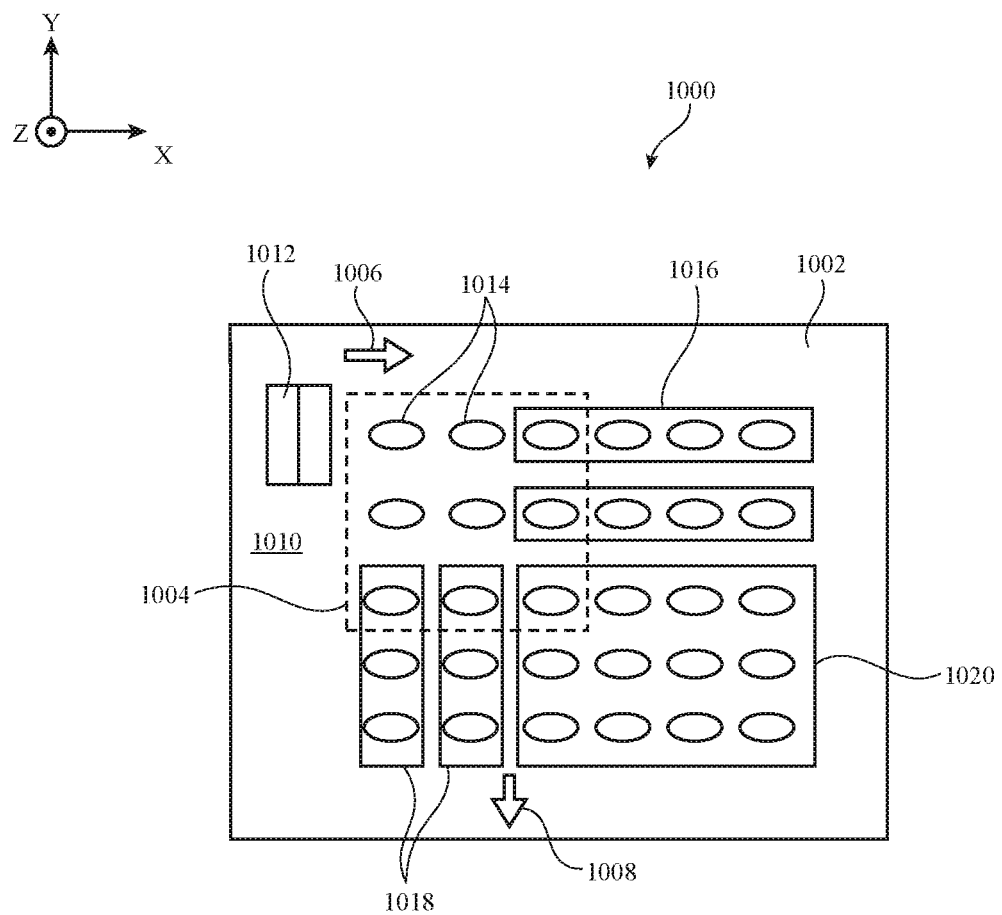
FIGS. 10A and 10B are top down views of an illustrative optical system that includes longitudinal light homogenizing structures formed over a waveguide to perform two-dimensional light homogenization across the waveguide in accordance with some embodiments.

FIG. 10A is a top-down view of the structures shown in FIG. 9 (e.g., as taken in the direction of arrow 912 of FIG. 9). As shown in FIG. 10A, system 1000 (e.g., system 900 of FIG. 9) may include waveguide 1002 (e.g., waveguide 902 of FIG. 9) having surface 1010 (e.g., surface 910 of FIG. 9). Light homogenization structures 1004 (e.g., light homogenization structures 904 of FIG. 9) may extend along the longitudinal dimension of waveguide 1002 (e.g., along the X-axis) and the lateral dimension of waveguide 1002 (e.g., along the Y-axis). Input coupler 1012 (e.g., a prism, an angled surface of a substrate in light homogenization structures 1004, other collimating optics, etc.) may couple light into light homogenization structures 1004. The light may propagate in the longitudinal dimension through homogenization structures 1004, as shown by arrow 1006. Replicated pupils 1014 may be produced where the light reflects off of the surfaces of waveguide 1002 as the light propagates. Light homogenization structures 1004 may serve to homogenize the light in longitudinal direction 1006 to create longitudinally-homogenized light 1016 in the longitudinal dimension (e.g., instead of individual pupils 1014, the light may be spread across the longitudinal dimension by the light homogenization structures, thereby providing more continuous and uniform light in the longitudinal dimension). Pupils 1014 as shown in FIG. 10A illustrate the pre-homogenized condition where the gaps between the pre-homogenized pupils have not yet been filled in by the homogenizing structure. As shown in FIG. 10A, the homogenizer may require a running distance (e.g., three pupil periods as shown in FIG. 10A) to achieve full homogenization in either dimension. Thus, the top row shown in FIG. 10A is not homogenous until the third pupil (e.g., the beginning of box 1016). Then, when light from the top row is coupled downwards, the entire pattern from the top row is not homogenized in the downward direction until the third row (e.g., the beginning of box 1020). As such, homogenization structures 1004 may extend over at least the first three columns and rows of pupils 1014 in waveguide 1002. This is merely illustrative and, if desired, homogenization structures 1004 may extend over greater areas (e.g., over the entire waveguide). In some embodiments, longitudinal homogenization may be achieved in a single worst-case pupil replication period.

Light homogenization structures 1004 may also couple the light homogenized in the longitudinal direction into a cross-coupler located on surface 1010 (e.g., adjacent to light homogenization structures 1004 or underneath light homogenization structures 1004) or located within waveguide 1010 (e.g., the cross-coupler may be formed from gratings embedded within waveguide 1002 such as cross-coupler 909 shown in FIG. 9). Light homogenization structures 1004 may overlap the cross-coupler, for example. On its own, the cross-coupler may homogenize light in the lateral dimension, as shown by arrow 1008 and homogenized light 1018. Because the cross coupler receives light that has been homogenized in the longitudinal dimension from light homogenization structures 1004, the cross coupler may homogenize this longitudinally-homogenized light in the lateral direction to produce a two-dimensional homogenized region of light 1020 (e.g., longitudinal light homogenization structures 1004 and the cross coupler may effectively produce two-dimensional homogenized light 1020). The two-dimensional homogenized light may be output coupled to an eye box or redirected in any desired directions (e.g., using diffraction gratings in waveguide 1002).

Figure 10B:
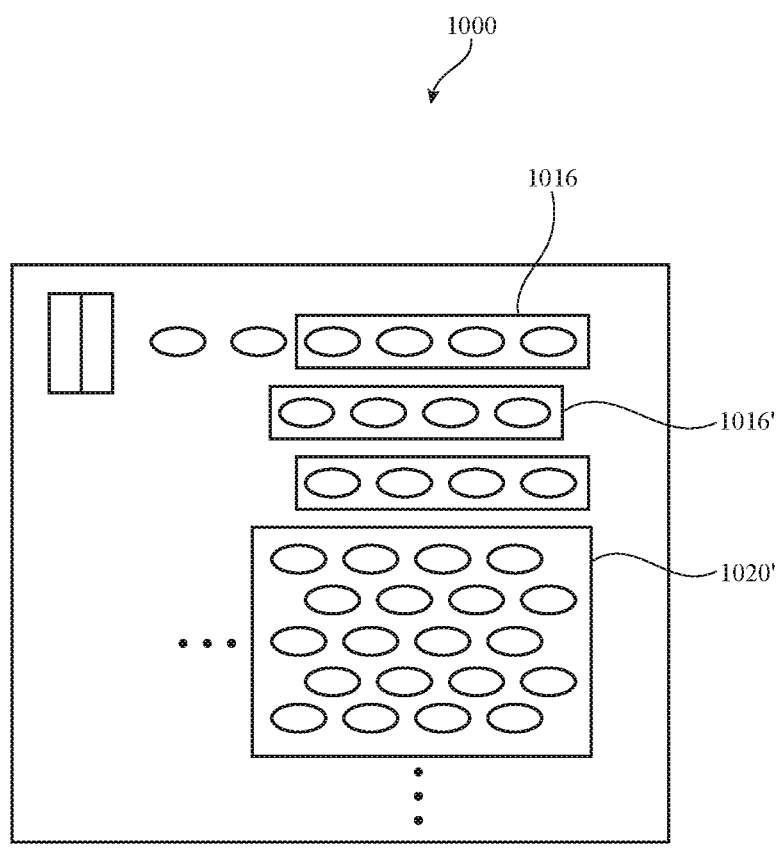

In the example of FIG. 10A, the cross coupler homogenizes laterally by diffracting light only on the upward (or downward) passes of the light as it propagates through waveguide 1012 (e.g., where "upward" and "downward" are described with reference to the Z-axis). This is merely illustrative. In another suitable arrangement, a cross coupler located near the center thickness of the waveguide may diffract light on both of the upward and downward passes through the media layer in waveguide 1002. FIG. 10B is a diagram showing how the cross coupler may homogenize the light in this example. As shown in FIG. 10B, the additional interactions of the cross coupler in this scenario may produce additional rows of homogenized light 1016' that are offset with respect to rows 1016 (e.g., by half a pupil period). This creates a denser hexagonal pattern of pupils (see, e.g., box 1020' of FIG. 10B) thereby further improving homogenization relative to the rectangular pattern shown in FIG. 10A.

Figure 11:
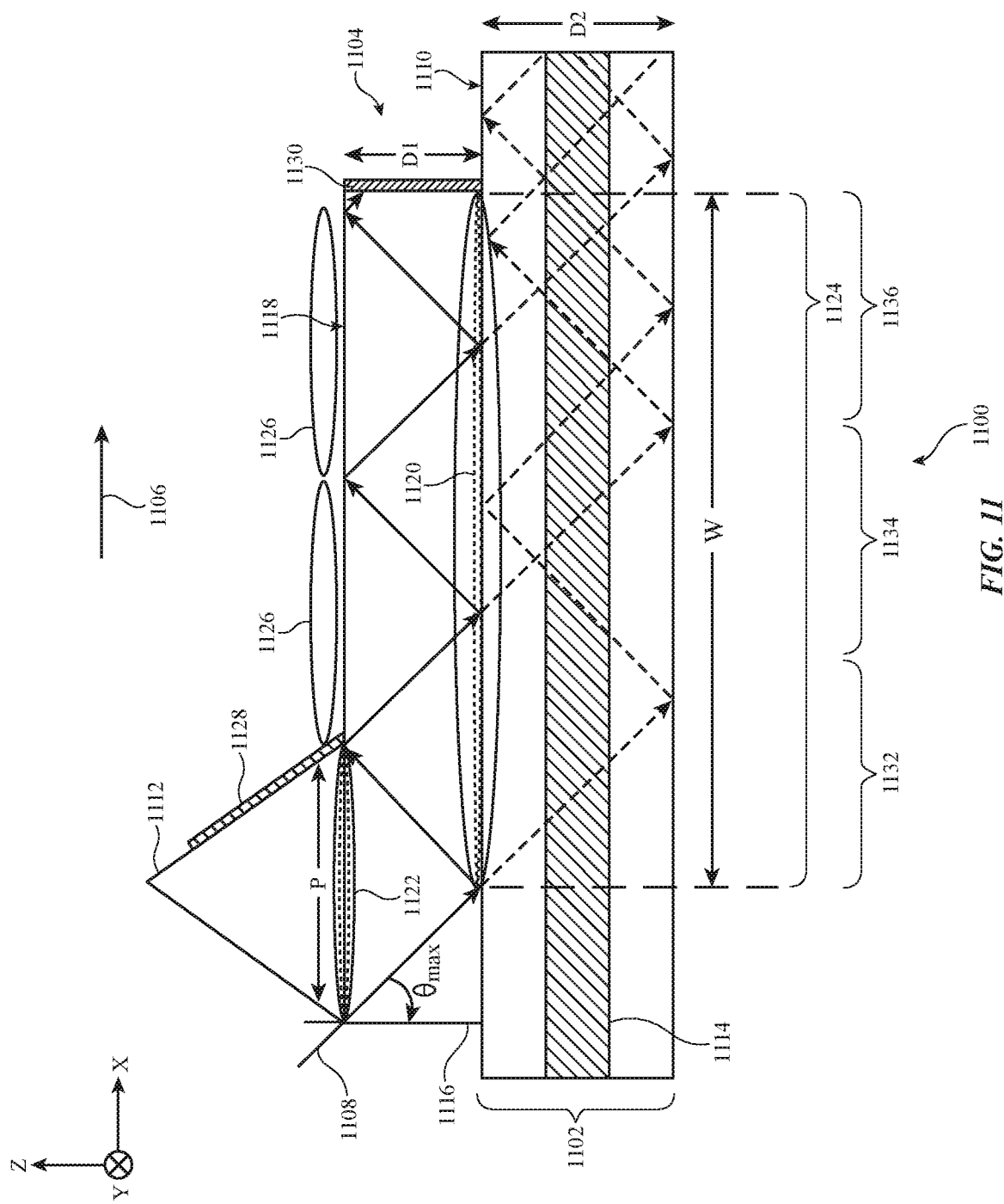
FIG. 11 is a side view of illustrative longitudinal light homogenizing structures that include a partially reflective layer on a bottom surface of a substrate mounted to an underlying waveguide in accordance with some embodiments.

FIG. 11 is a side view of illustrative longitudinal light homogenization structures that may be used to homogenize input light in the longitudinal dimension. As shown in FIG. 11, system 1100 may include longitudinal light homogenization structures 1104 (e.g., light homogenization structures 1004 of FIGS. 10 and 904 of FIG. 4) mounted to surface 1110 (e.g., surface 1010 of FIG. 10 and surface 910 of FIG. 9) of waveguide 1101 (e.g., waveguide 1002 of FIG. 10 and waveguide 902 of FIG. 9). Waveguide 1102 may include grating medium 1114 sandwiched between two waveguide substrates, for example. Grating medium 1114 may include grating structures (e.g., holograms).

Light homogenization structures 1104 may include substrate 1116 (sometimes referred to herein as duct 1116 or duct structure 1116). Substrate 1116 may extend along the longitudinal dimension of waveguide 1102 (e.g., parallel to the X-axis). Additionally, optical system 1100 may include a light input section such as prism 1112. Prism 1112 may be mounted to surface 1118 of substrate 1116 or to a separate prism plinth coupled to the left edge of substrate 1116. Light 1108 may be incident at prism 1112 and coupled into substrate 1116 via prism 1112 (or via the prism plinth).

The bottom surface of substrate 1116 may be coated with a partially reflective layer such as partially reflective layer 1120. Partially reflective layer 1120 may be a dielectric coating, a metallic coating, a polymer film, a polarization layer, a refractive index-mismatched layer, grating structures (e.g., one or more holograms) or any other desired structures. Partially reflective layer 1120 may be formed on the bottom surface of substrate 1116, on surface 1110 of waveguide 1102, from a separate layer interposed between substrate 1116 and surface 1110, or may be embedded within substrate 1116.

One or more light beams (e.g., modes) 1108 of an in-coupled pupil area 1122 may be in-coupled via prism 1112 and directed through substrate 1116. Modes 1108 may be collimated and propagated through light homogenization element 1104 (e.g., in the longitudinal dimension as shown by arrow 1106) with uniform transmission into waveguide 1102 through partially reflective layer 1120. Each collimated mode 1108 may correspond to a display pixel of the image projection, as one example. The properties of the light homogenization structures 1104, including adhesion to waveguide 1102 and the reflectivity of partially reflective layer 1120 may allow for a larger replicated pupil copy spanning an area 1124 at waveguide 1102. Area 1124 of the replicated pupil copy may correspond to a length W associated with the ray path of the one or more in-coupled light modes 1108 through substrate 1104. Area 1124 may, for example, correspond to light 1016 of FIG. 10. Thus, the coupling structure may serve as a pupil expander, increasing the replicated pupil copy of the optical system 1100. The replicated pupil copy may be fully homogenized throughout the optical system 1100 in the longitudinal dimension (see, e.g., light 1016 of FIG. 10), up to a maximum mode angle $\theta_{max}$ defined by the trigonometric equation $$\theta_{max} = \tan^{-1}\left(\frac{W}{2D2}\right).$$

Each mode 1108 may be characterized as fully homogenized when the pupil length is substantially equivalent to the pupil replication period. Thus, homogenization may correspond to an absence of overlap or gaps between each of the one or more replicated pupil areas 1126. The largest input pupil in-coupled at prism 1112 may correspond to lateral prism length p. In some cases, prism length p may be equivalent to the in-coupled pupil area 1122. A large mode angle may aid in the ability of optical system 1100 to achieve a large FOV in the longitudinal dimension, at the discretion of the prism length p and the thickness D1 of substrate 1116. In the case of full homogenization, $\theta_{max}$ may be defined in terms of the prism length p and thickness D1 of substrate 1116 via the trigonometric equation $$\theta_{max} = \tan^{-1}\left(\frac{P}{2D1}\right).$$

For example, for a heterogeneous waveguide 1102, of thickness 1.5 mm, intercoupled with a common waveguide system including substrate 1116 and prism 1112 may achieve full-homogenization of reflected modes 1108 within each replicated pupil copy 1126, subject to a mode angle range. Specifically, thickness D1=1.5 mm and a 12 mm prism 1112, may achieve an external FOV of 53.4 degrees in the waveguided dimension, as an example (e.g., in a scenario where the prism is directly attached to the 1.5 mm thick waveguide). Each mode 1108 contained within the emitted output pupil, spanning the achieved external FOV, may be fully homogenized up to a maximum mode angle $\theta_{max}$ of approximately 76 degrees, as an example.

In some cases, partially reflective layer 1120 may aid in isolating bright, un-depleted light within substrate 1116 and alternative light of the waveguide 1102. Additionally, it may be beneficial to reduce the thickness D1 of substrate 1116 to allow for a smaller prism 1112 and compact external projection optics while achieving a substantially equivalent maximum mode angle $\theta_{max}$ for full homogenization. In some cases, the aforementioned embodiment may reduce the in-coupled pupil of the optical system 1100 and lessen the required working distance for propagation of a mode 1108, permitting further compactness of external projection optics. For example, a substrate 1116 of thickness D1=0.5 mm, may be adhered to a waveguide 1102 of thickness D2=1.5 mm, and may allow the same maximum mode angle $\theta_{max}$ of 76 degrees via in-coupling at a 4 mm prism 1112, as just one example (e.g., using a 0.5 mm duct may allow a relatively small prism 1112 to be used, relative to scenarios where the prism is directly attached to the waveguide). In general, dimension D1 of substrate 1116 may be less than dimension D2 of waveguide 1102.

If desired, an absorber such as absorber 1128 may be formed on one or more surfaces of prism 1112 and/or an absorber such as absorber 1130 may be formed at the end of substrate 1116 to minimize stray light. The reflectivity of layer 1120 may vary across the longitudinal dimension of system 1100. For example, layer 1120 may have a first region 1132 closest to prism 1112 with a first reflectivity (e.g., 80%, 70%, 90%, between 70 and 90%, etc.), a second region 1134 having a second reflectivity less than the first reflectivity (e.g., 60%, 70%, 50%, between 50 and 70%, etc.), and a third region 1136 having a third reflectivity less than the second reflectivity (e.g., 40%, 50%, 30%, between 30 and 50%, etc.). This is merely illustrative and, in general, layer 1120 may have any desired number of regions with different reflectivity. Reflectivity of layer 1120 may be varied continuously if desired. This may serve to optimize uniformity of the light across the longitudinal dimension of system 1100, for example. Layer 1120 may be provided with a reflectivity that depends on angle, wavelength, or polarization if desired (e.g., layer 1120 may be more reflective for incident light at lower angles than higher angles).

Figure 12:
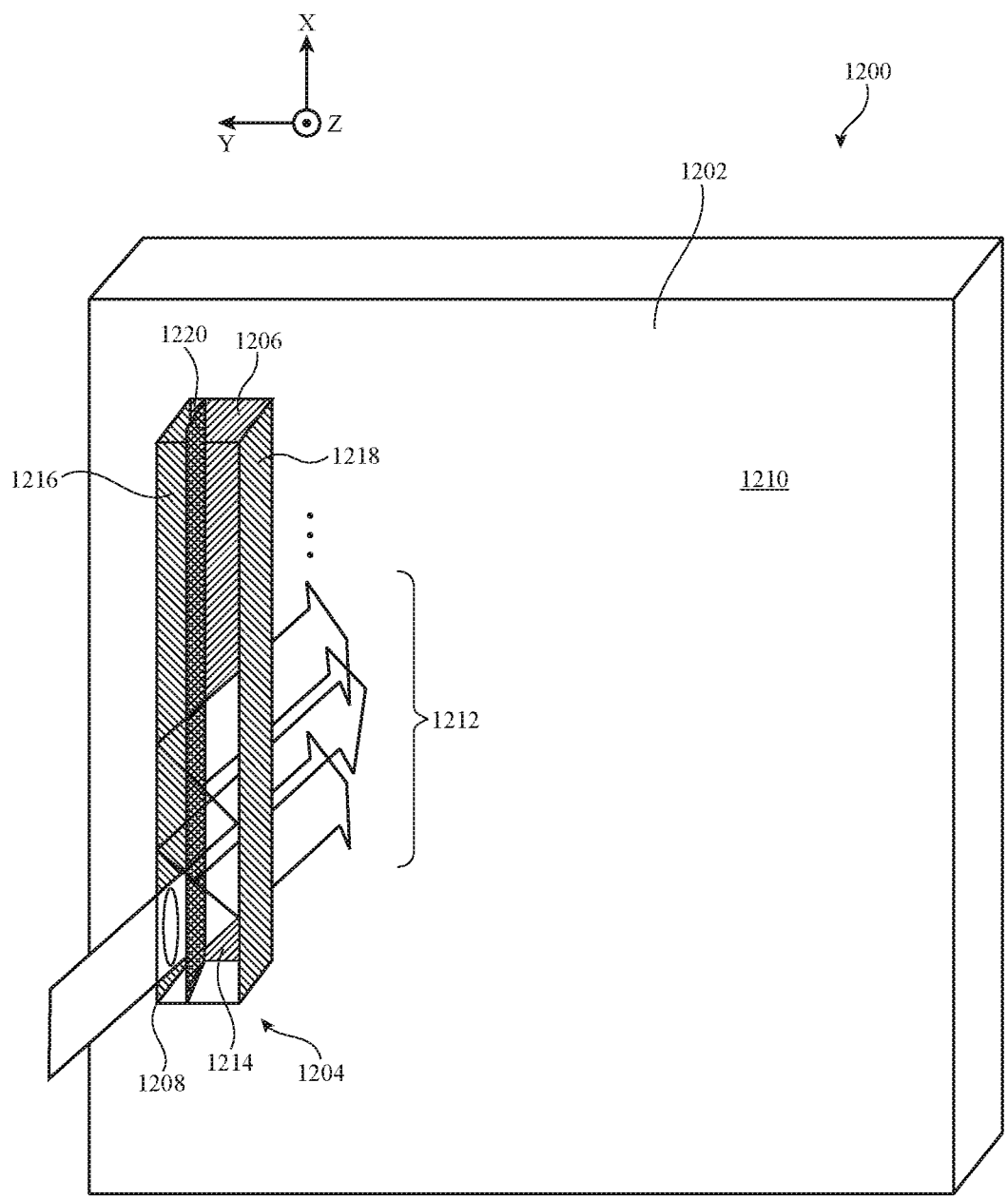
FIG. 12 is a top perspective view of illustrative longitudinal light homogenizing structures that include perpendicular reflective surfaces on a substrate mounted to an underlying waveguide in accordance with some embodiments.

The example of FIG. 11 is merely illustrative. Longitudinal light homogenization structures 1104 may include other structures such as multiple partially or totally reflective layers and/or reflective layers oriented orthogonal to the surface of the underlying waveguide, retarders, polarizers, or other optical elements. In another suitable arrangement, substrate 1116 may be provided with a relatively high index of refraction (e.g., 1.83 or higher) to achieve pupil period shortening. This may also serve to reduce the required size (e.g., dimension p) for prism 1112. FIG. 12 is a top-down perspective view showing one example of how the longitudinal light homogenization structures may include multiple reflective layers oriented perpendicular to the underlying waveguide.

As shown in FIG. 12, system 1200 may include lateral light homogenization structures 1204 mounted to surface 1210 (e.g., surface 1010 of FIG. 10 and surface 910 of FIG. 9) of waveguide 1202 (e.g., waveguide 1002 of FIG. 10 and waveguide 902 of FIG. 9). Light may be coupled into homogenization structures 1204 as shown by input pupil 1208 (e.g., using a prism structure as shown in FIG. 11 or using other input couplers 1012 of FIG. 10). This light may propagate along the longitudinal dimension of waveguide 1202 (e.g., parallel to the X-axis). Homogenization structures 1204 may homogenize light 1208 in the lateral direction.

For example, homogenizations structures 1204 may include multiple reflective layers formed on or within substrate 1206 (sometimes referred to herein as duct 1206 or duct structure 1206). Substrate 1206 may be mounted to surface 1210. The reflective layers may be oriented perpendicular to surface 1210. Homogenization structures 1204 may emit a laterally expanded (homogenized) output pupil 1212 (e.g., light 1016 of FIG. 10). Substrate 1206 may be fabricated from a single substrate (e.g., a piece of glass) and may include at least a bottom surface 1214 (e.g., a surface on surface 1210 of waveguide 1202) and one or more parallel, planar layers 1216, 1218, and 1220. Layers 1216, 1218, and 1220 may lie in planes perpendicular to surfaces 1214 and 1210. Planar layers 1216, 1218, and 1220 may extend across some or all of the height of substrate 1206 (e.g., parallel to the Z-axis) and may extend along the longitudinal axis of system 1200.

Planar layers 1216 and 1218 may, for example, be fully reflective coatings (e.g., coatings having an approximately 100% reflection coefficient) such as dielectric coatings, metallic coatings, grating structures, etc. that are fully or nearly fully reflective. Planar layer 1220 may be a partially reflective coating. Planar layer 1220 may be a dielectric coating, metallic coating, grating structure, etc. Planar layer 1220 may have variable reflectivity along the longitudinal dimension if desired (e.g., as described in connection with layer 1120 of FIG. 1). Layers 1218 and 1216 may be formed on the exterior surfaces of substrate 1206 whereas layer 1220 is embedded within substrate 1206. In another suitable arrangement, substrate 1206 may be formed from two different substrate layers where layer 1220 is sandwiched between the two substrate layers.

Each of the planar layers 1218, 1216, and 1220 may sustain parallelism throughout the respective substrate 1206 as a means to preserve image resolution. In addition, planar layers 1218, 1216, and 1220 may maintain perpendicularity to surface 1214 and 1210 exhibiting orthogonal corners within substrate 1206 and preserving image resolution. Reflective layers 1218 and 1216 and partially reflective layer 1220 may be used to provide uniform output intensity at output pupil 1212 (e.g., constant pupil brightness throughout the output light comprising the output pupil 1212) according to uniform or varying incidence angles, wavelengths, polarizations, and the like. In some embodiments, reflective layers 1218, 1216, and 1220 may reflect input light at angles below the critical angle of the substrate (e.g., approximately 42 degrees for glass-to-air interface). The reflectivity may result in reduced pupil replication gaps for the pupil expansion. That is, neighboring beams of the output pupil 1212 may be directly adjacent to one another (e.g., some of the beams from output pupil 1212 may be produced by reflection off of layer 1216 and transmission through layer 1220 whereas other beams from output pupil 1212 may be produced by reflection off of layer 1220). In some cases, each end may be coated with an absorptive or reflective coating element as a means to at least mitigate stray light emission by substrate 1206. Output pupil 1212 may be provide downwards into waveguide 1202 and/or to a cross-coupler (e.g., the light may pass through surface 1214 at the bottom of substrate 1206 because layer 1218 is fully reflective).

One or more of planar layers 1216, 1218, and 1220, and/or one of the ends of substrate 1206 (e.g., layer 1216 in the example of FIG. 12) may include a region or aperture for input pupil 1208. The region or aperture may be uncoated or specially-coated to facilitate the input. Light of the input pupil 1208 may enter the aperture of substrate 1206. In some cases, the contained light modes of input pupil 1208 may be reflected by at least planar layers 1216, 1218, and 1220 within substrate 1206. The reflected light of input pupil 1208 may have a first angle of reflection within a total internal reflection (TIR) range with respect to an axis common to the propagation direction of duct structure 1206. At least planar layers 1216 and 1218 may guide the reflected light of input pupil 1208 at a second angle of reflection with respect to a second, transverse axis to the propagation direction (e.g., a direction along the longitudinal dimension). Substrate 1206 may then emit the reflected light modes as an output pupil 1212 for guided image projection. In the case of one or more partially reflective coatings elements, the configuration of the coating elements may provide uniform output pupil intensity (e.g., constant pupil brightness) of the reflected light modes in accordance with uniform, or varying, incidence angle, wavelength, and polarization.

Partially reflective layer 1220 may sustain parallelism with planar layers 1216 and 1218 and maintain perpendicularity with surface 1214. Layer 1220 may include a partially reflective coating element to homogenize the TIR modes of input pupil 1208, thus improving lateral homogenization. For example, layer 1220 may sustain approximately 50 percent reflectivity and may be oriented at an offset of planar layer 1216 (e.g., offset at ⅓ a width of substrate 1206) and extend a length of the substrate 1206 parallel to the planar layer 1218. Layer 1220 may guide propagating light within the transverse dimension of substrate 1206 in accordance with the partially reflective properties of the layer 1220, improving lateral homogenization of light reflected back toward planar layer 1216 and light permitted through to planar layer 1218. In some embodiments, layer 1220 may implement one or more skew mirrors or alternate partially reflective surfaces.

Input light modes including input pupil 1208 may enter substrate 1206 via an aperture of layer 1208. In alternate embodiments, the aperture may be located at an alternative planar region, surface, or end of substrate 1206. The input light may propagate into substrate 1206, and reflect at a first angle of reflection within a TIR range common to a first axis. In some cases, the first axis may be common to a propagation direction of substrate 1206. Planar layers 1216 and 1218 may guide the light modes of input pupil 1208 in a transverse (e.g., non-TIR) dimension of a second, alternative axis. The propagated light may be directed to the partially reflective layer 1220. Light transmitting through the partially reflective layer 1220 may constitute an expanded output pupil 1212 for projection. Output pupil 1212 may be composed of one or more replications of input pupil 1208, without gaps between the replications. The intensity of output pupil 1212 may be substantially uniform, with sustained image fidelity.

Figure 13A:
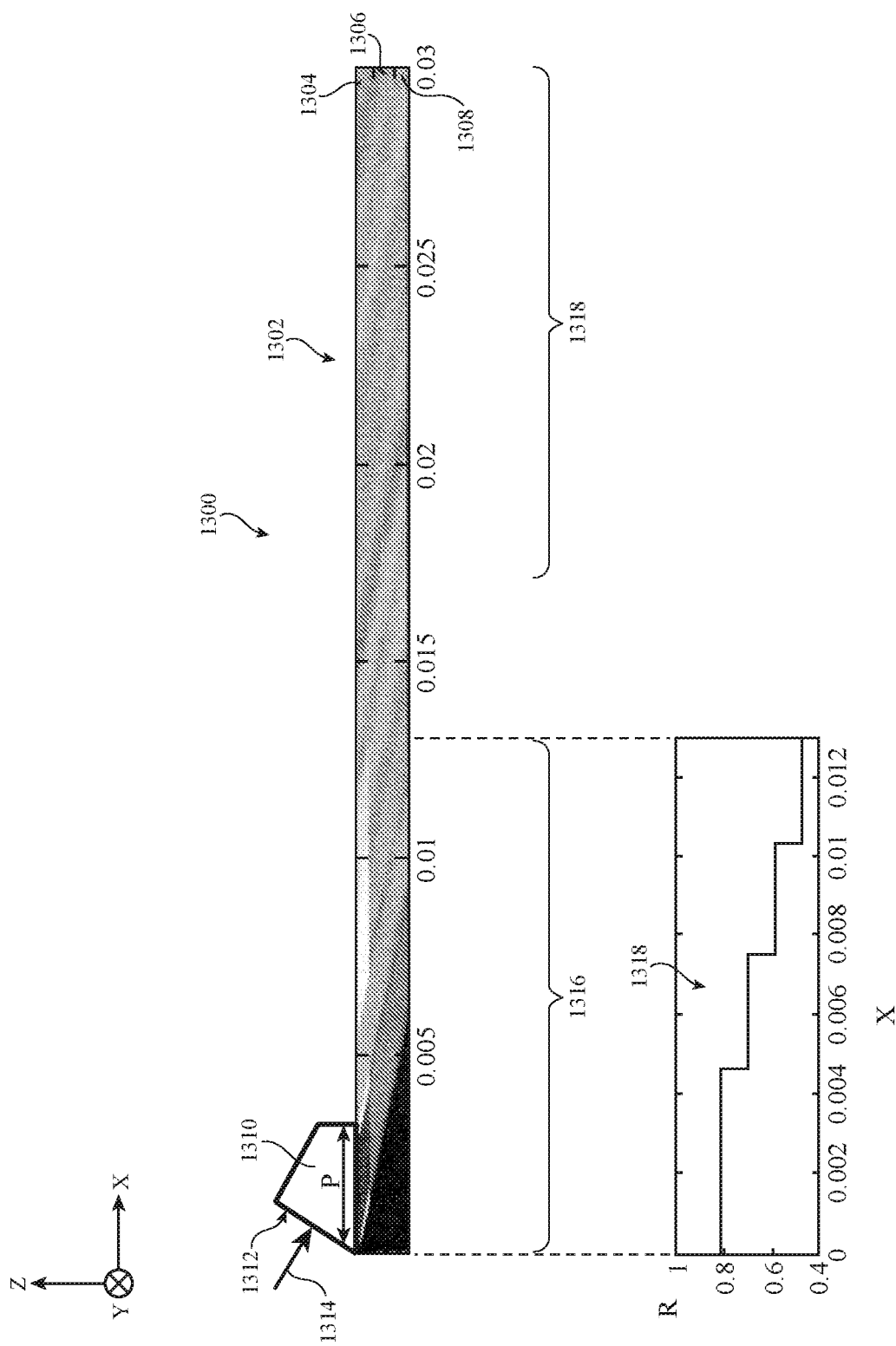
FIGS. 13A and 13B show illustrative light homogenization structures having a spatially-varying partial reflector formed internal to a waveguide in accordance with some embodiments.
Figure 13B:
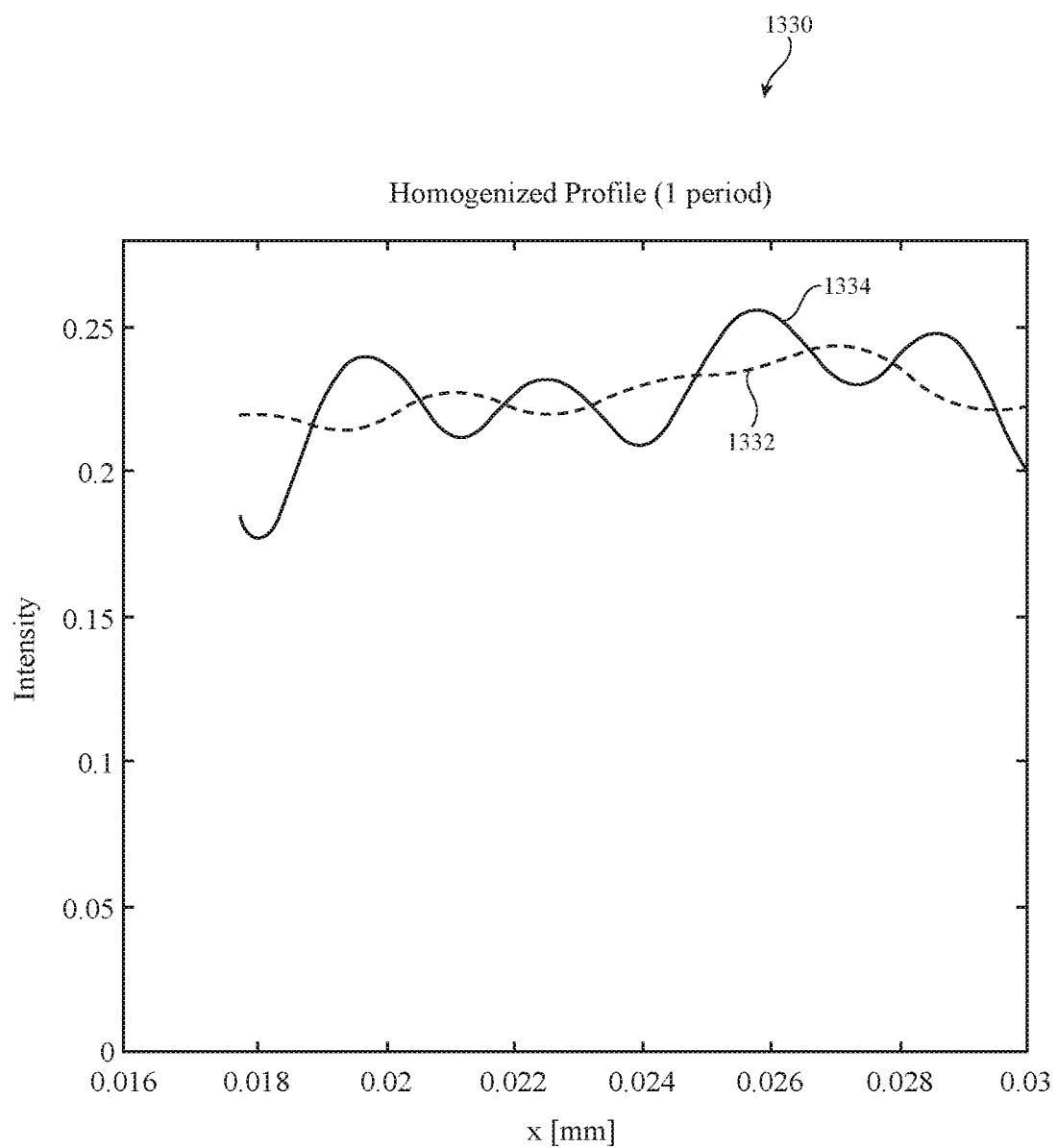
Figure 14:
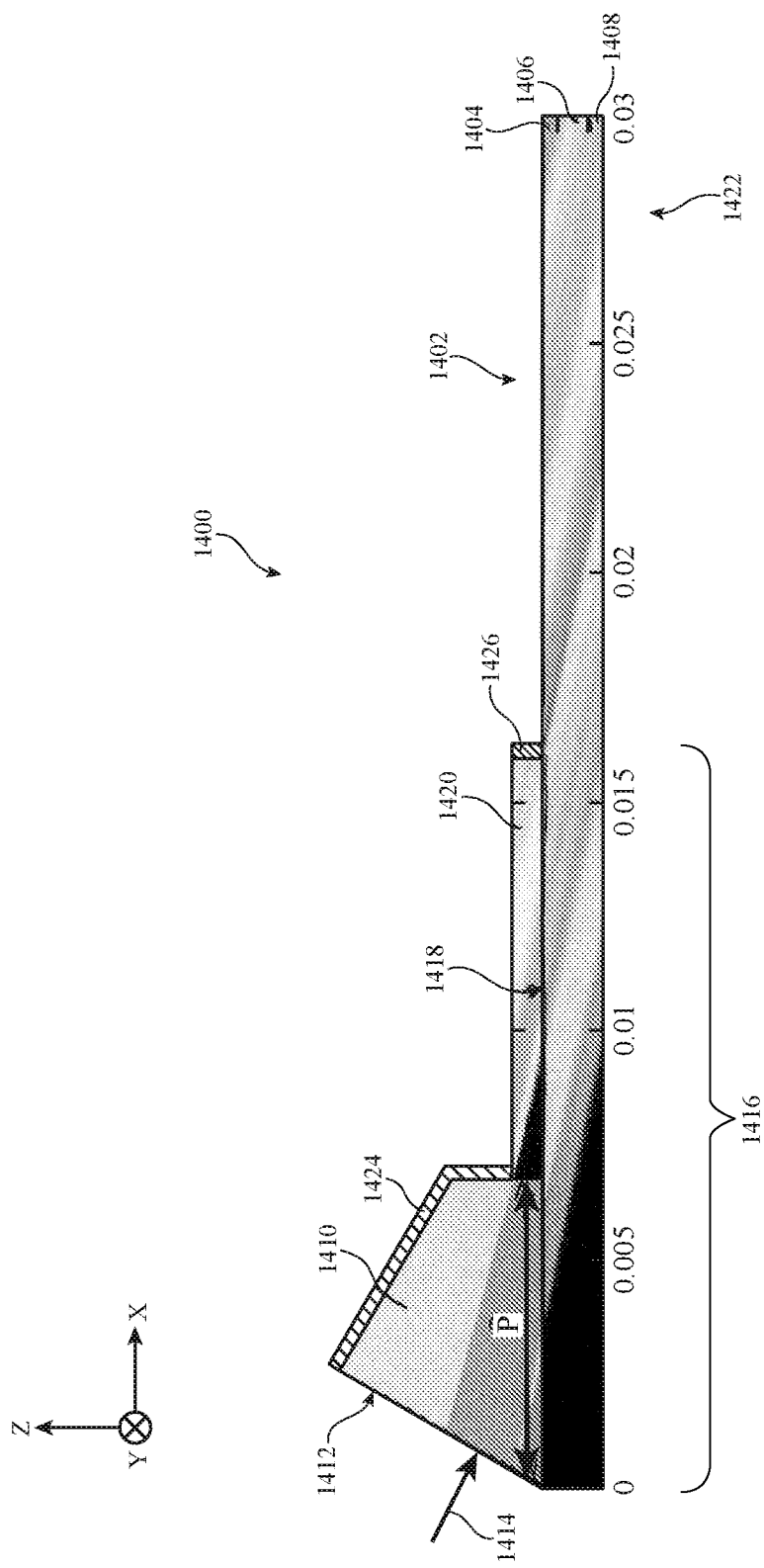
FIG. 14 is a side view of illustrative light homogenization structures having a spatially-varying partial reflector formed external to a waveguide in accordance with some embodiments.

If desired, in some embodiments, light may be homogenized in approximately one pupil period using spatially varying reflectivity (e.g., using spatially varying reflective layers in the arrangements described above in connection with FIGS. 10-12). FIGS. 13A, 13B, and 14 are a diagrams showing how light may be homogenized in approximately one pupil period using spatially varying reflectivity. In the example of FIGS. 13A and 13B, the light homogenization structures are formed internal to the waveguide (e.g., similar to the arrangements described above in connection with FIGS. 4-8). In the example of FIG. 14, the light homogenization structures are formed external to the waveguide (e.g., similar to the arrangements described above in connection with FIG. 11).

As shown in FIG. 13A, optical system 1300 may include waveguide 1302 having grating medium 1306 stacked between waveguide substrates 1304 and 1308 (e.g., similar to the arrangement shown in FIG. 5 but with a spatially-varying reflectivity). The position on the waveguide along the x axis is denoted in FIG. 13A in meters beginning at x=0 at the left side of the waveguide. Prism 1310 may be mounted to waveguide 1302 and may receive input light 1314 at input face 1312. Prism 1310 may couple light 1314 into waveguide 1302. A partially reflective structure (sometimes referred to herein as a partial reflector or partially reflective layers) may be formed in region 1316 (e.g., embedded in grating medium 1306, on a surface of grating medium 1306, on a surface of waveguide substrate 1304, and/or on a surface of waveguide substrate 1308, etc.). The partial reflector may include one or more partially reflective coatings, dielectric layers, metallic layers, grating structures, etc. In the example of FIG. 3, waveguide 1302 may have a thickness that is approximately equal to 1.3 mm (e.g., waveguide substrates 1304 and 1308 may each be 0.3 mm thick whereas grating medium 1306 is 0.7 mm thick). This is merely illustrative and, in general, other thicknesses may be used. Prism 1310 may have a relatively low length P in this arrangement (e.g., approximately 3 mm).

Region 1316 may have any desired width. In one suitable arrangement, the width of region 1316 may be approximately equal to one pupil period (e.g., approximately 13 mm). The partial reflector may exhibit a spatially varying reflectivity along the x-axis within region 1316. For example, the partial reflector may have a reflectivity given by graph (reflectivity profile) 1318, which plots reflectivity R as a function of distance x across the length of the partial reflector in region 1316. As shown by graph 1318, the partial reflector in the example of FIG. 13A has four discrete reflectivities within different regions of the partial reflector (e.g., R=⅘ beginning at x=0, then R=⅔, then R=½, and then R=0 to the right of region 1316). The reflectivity of the partial reflector in this example may be given by the formula $R_i \sim 2-1/(R_{i-1})$, where $R_i$ is the reflectivity of the $i^{th}$ region of the partial reflector along the x-axis. This is merely illustrative and, in general, any desired reflectivities may be used. The partial reflector may have any desired number of discrete reflectivities, or a continuously variable reflectivity curve (e.g., in scenarios where a metallic coating is used to form the partial reflector). The partial reflector may be provided with this reflectivity profile by providing four stacked partially reflective layers in the left-most portion of region 1316 (e.g., where R=⅘), three stacked partially reflective layers in the second left-most portion of region 1316 (e.g., where R=¾), two stacked partially reflective layers in the second right-most portion of region 1316 (e.g., where R=⅔), and one partially reflective layer in the right-most portion of region 1316 (e.g., where R=½), as just one example.

Light 1314 that has been coupled into the waveguide may propagate down the length of the waveguide (e.g., where light intensity is illustrated by lighter shading within the waveguide in the example of FIG. 13A). The light may be substantially homogenized within region 1318 at the opposing end of the waveguide. Region 1318 may, for example, have a width that is approximately equal to one pupil period (e.g., 12 mm). In this way, homogenization may occur within approximately one pupil period. In the example of FIG. 13A, a worst case pupil period is assumed (e.g., where the light is incident at a relatively high angle such as 78 degrees). At lower angles, the light will homogenize more quickly within the waveguide.

FIG. 13B shows an exemplary homogenization profile 1330 for optical system 1300 within region 1318. Curve 1334 of FIG. 13B plots the raw intensity of light within region 1318 (e.g., as a function of the x position across the region). Curve 1332 plots the filtered intensity of light within region 1318 (e.g., when provided with a 4 mm iris filter). The metric associated with FIG. 13B is 1−std/mean. As shown by curves 1332 and 1334, the light is provided at a relatively uniform intensity across region 1318. Thus, the spatially varying partial reflector in waveguide 1302 may homogenize light within approximately one pupil period at region 1318.

FIG. 14 shows how the light homogenization structures having spatially varying reflectivity may be formed external to the waveguide (e.g., similar to the arrangements described above in connection with FIG. 11 but with a spatially-varying reflectivity). As shown in FIG. 14, optical system 1400 may include waveguide 1402 having grating medium 1406 stacked between waveguide substrates 1404 and 1408. The position on the waveguide along the x axis is denoted in FIG. 14 in meters beginning at x=0 at the left side of the waveguide. Substrate 1420 may be mounted to waveguide substrate 1404. Prism 1410 may be mounted to waveguide substrate 1404 at the end of substrate 1420 and may receive input light 1414 at input face 1412. In another suitable arrangement, prism 1410 may be mounted to substrate 1420 (e.g., similar to prism 1112 of FIG. 11). Prism 1410 may couple light 1414 into waveguide 1302. A partially reflective structure such as partial reflector 1418 may be formed in region 1416 (e.g., on the upper surface of waveguide substrate 1404, on the lower surface of substrate 1420 and prism 1410, embedded within substrate 1420 and prism 1410, etc.). Partial reflector 1418 may include partially reflective coatings, dielectric layers, metallic layers, grating structures, etc. In the example of FIG. 14, waveguide 1402 may have a thickness that is approximately equal to 1.3 mm (e.g., waveguide substrates 1404 and 1408 may each be 0.3 mm thick whereas grating medium 1406 is 0.7 mm thick), whereas substrate 1420 has a thickness that is approximately equal to 0.65 mm. This is merely illustrative and, in general, other thicknesses may be used. Prism 1410 may have a relatively low width P in this arrangement that is approximately equal to half of the duct pupil period (e.g., approximately 3 mm). Optional light absorption layers may be provided such as absorption layer 1424 on prism 1410 and absorption layer 1426 on the end of substrate 1420 to mitigate stray light if desired.

Partial reflector 1418 may be provided with a spatially-varying reflectivity (e.g., partial reflector 1418 may have different regions with discrete reflectivities such as those associated with plot 1318 of FIG. 13A or other reflectivities). As shown in FIG. 14, similar to the arrangement described above in FIG. 13A, the partial reflector may homogenize light within approximately one pupil period at the opposing end of the waveguide (e.g., end 1422 as shown in FIG. 14). The arrangement of FIG. 14 may, for example, allow for a thicker duct to match projector pupil size without requiring a thicker waveguide, may allow for a projector aperture stop (e.g., in scenarios where the prism is formed directly on the waveguide substrate), and may mitigate the need to write through a coating.

Figure 15:
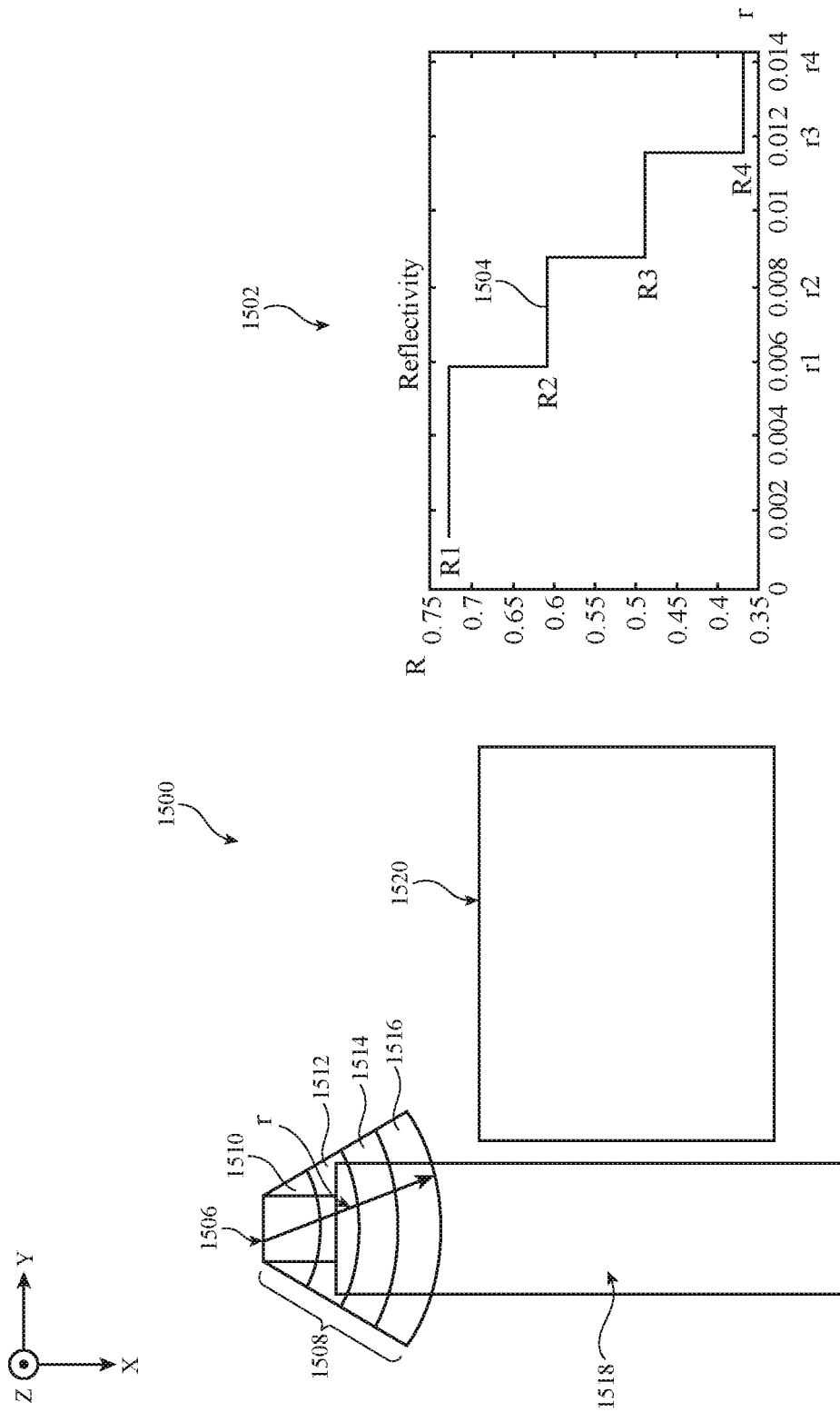
FIG. 15 is a top-down view of an illustrative spatially-varying partial reflector in accordance with some embodiments.

In the examples of FIGS. 13A, 13B, and 14, the light homogenization structures are shown as having partial reflectors with reflectivities varying along only a single dimension for the sake of clarity. FIG. 15 shows a top-down view of light homogenization structures having spatially-varying reflectivity and that may be used to form the homogenization structures of FIG. 13A, FIG. 14, or other homogenization structures. In the example of FIG. 15, the waveguide has been omitted for the sake of clarity.

As shown in FIG. 15, optical system 1500 may include a prism 1506 formed over partial reflector 1508 (e.g., partial reflector 1418 in FIG. 14 or the partial reflector in region 1316 of FIG. 13A). Partial reflector 1508 may serve to homogenize light in-coupled by prism 1506 (e.g., along the x-axis). The homogenized light may be re-directed by cross coupler 1518 to output coupler 1520, as just one example. Partial reflector 1508 may have different regions with different discrete reflectivities. The reflectivity of partial reflector 1508 may be a function of the radial distance (radius) r from the center of the in-coupling face (edge) of prism 1506. The examples described above in which a prism (e.g., prism 1410 of FIG. 14, prism 1506 of FIG. 15, prism 1310 of FIG. 13, and prism 1112 of FIG. 11) is used as an input coupling means for the waveguide are merely illustrative. In general, any desired input coupling means may be used.

Graph 1502 plots the reflectivity R of partial reflector 1508 as a function of radius r. As shown by curve 1504 of graph 1502, partial reflector 1508 may have a first reflectivity R1 (e.g., 0.73, between 0.7 and 0.8, etc.) from r=0 to r=r1 (e.g., within region 1510 of partial reflector 1508), a second reflectivity R2 (e.g., 0.61, between 0.6 and 0.7, etc.) from r=r1 to r=r2 (e.g., within region 1512 of partial reflector 1508), a third reflectivity R3 (e.g., 0.48, between 0.4 and 0.6, etc.) from r=r2 to r=r3 (e.g., within region 1514 of partial reflector 1508), and a fourth reflectivity R4 (e.g., 0.361, between 0.3 and 0.4, etc.) from r=r3 to r=r4 (e.g., within region 1516 of partial reflector 1508). In one suitable arrangement, a four-layer coating is used to form partial reflector 1508. For example, a first partially reflective layer may overlap regions 1510, 1512, 1514, and 1516, a second partially reflective layer may overlap regions 1510, 1512, and 1514, a third partially reflective layer may overlap regions 1510 and 1512, and a fourth partially reflective layer may overlap region 1510 to produce the reflectivity profile associated with curve 1504. These coating layers may be deposited using coating masks. Radius r1 may be approximately 5.9 mm, radius r2 may be approximately 8.8 mm, radius r3 may be approximately 11.6 mm, and radius r4 may be approximately 14.3 mm, as just one example. Other radii may be used if desired. Partial reflector 1508 may have any desired number of regions with different reflectivities and these regions may have any desired shapes. If desired, many discrete regions may be used to approximate a continuous reflectivity curve (e.g., to optimize light homogenization).

While various embodiments have been described and illustrated herein, other means and/or structures for performing the function and/or obtaining the results and/or one or more of the advantages described herein may be used, and each of such variations and/or modifications is deemed to be within the scope of the embodiments described herein. More generally, all parameters, dimensions, materials, and configurations described herein are merely illustrative and actual parameters, dimensions, materials, and/or configurations may depend upon the specific application or applications for which the embodiments is/are used. The embodiments may be practiced in any desired combination. Also, various concepts may be embodied as one or more methods, devices or systems, of which an example has been provided. The acts performed as part of a method or operation may be ordered in any suitable way. Accordingly, embodiments may be constructed in which acts are performed in an order different than illustrated, which may include performing some acts simultaneously, even though shown as sequential acts in embodiments. As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. Transitional phrases such as "comprising," "including," "carrying," "having," "containing," "involving," "holding," "composed of," and the like are to be understood to be open-ended, i.e., to mean including but not limited to. The term "approximately," refers to plus or minus 10% of the value given.

The term "approximately" as used herein refers to plus or minus 10% of the value given. The term "about," refers to plus or minus 20% of the value given. The term "principally" with respect to reflected light, refers to light reflected by a grating structure. Light that is principally reflected at a recited angle includes more light than is reflected at any other angle (excluding surface reflections). Light that is principally reflected about a recited reflective axis includes more reflected light than is reflected about any other reflective axis (excluding surface reflections). Light reflected by a device surface is not included when considering principally reflected light. The term "reflective axis" refers to an axis that bisects an angle of incident light relative to its reflection. The absolute value of an angle of incidence of the incident light relative to the reflective axis is equal to the absolute value of the angle of reflection of the incident light's reflection, relative to the reflective axis. For conventional mirrors, the reflective axis is coincident with surface normal (i.e., the reflective axis is perpendicular to the mirror surface). Conversely, implementations of skew mirrors according to the present disclosure may have a reflective axis that differs from surface normal, or in some cases may have a reflective axis that is coincident with surface normal. A reflective axis angle may be determined by adding an angle of incidence to its respective angle of reflection, and dividing the resulting sum by two. Angles of incidence and angles of reflection can be determined empirically, with multiple measurements (generally three or more) used to generate a mean value.

The term "reflection" and similar terms are used in this disclosure in some cases where "diffraction" might ordinarily be considered an appropriate term. This use of "reflection" is consistent with mirror-like properties exhibited by skew mirrors and helps avoid potentially confusing terminology. For example, where a grating structure is said to be configured to "reflect" incident light, a conventional artisan might prefer to say the grating structure is configured to "diffract" incident light, since grating structures are generally thought to act on light by diffraction. However, such use of the term "diffract" would result in expressions such as "incident light is diffracted about substantially constant reflective axes," which could be confusing. Accordingly, where incident light is said to be "reflected" by a grating structure, persons of ordinary skill in art, given the benefit of this disclosure, will recognize that the grating structure is in fact "reflecting" the light by a diffractive mechanism. Such use of "reflect" is not without precedent in optics, as conventional mirrors are generally said to "reflect" light despite the predominant role diffraction plays in such reflection. Artisans of ordinary skill thus recognize that most "reflection" includes characteristics of diffraction, and "reflection" by a skew mirror or components thereof also includes diffraction.

The term "light" refers to electromagnetic radiation. Unless reference is made to a specific wavelength or range of wavelengths, such as "visible light," which refers to a part of the electromagnetic spectrum visible to the human eye, the electromagnetic radiation can have any wavelength. The terms "hologram" and "holographic grating" refer to a recording of an interference pattern generated by interference between multiple intersecting light beams. In some examples, a hologram or holographic grating may be generated by interference between multiple intersecting light beams where each of the multiple intersecting light beams remains invariant for an exposure time. In other examples, a hologram or holographic grating may be generated by interference between multiple intersecting light beams where an angle of incidence of at least one of the multiple intersecting light beams upon the grating medium is varied while the hologram is being recorded, and/or where wavelengths are varied while the hologram is being recorded (e.g., a complex hologram or complex holographic grating).

The term "sinusoidal volume grating" refers to an optical component which has an optical property, such as refractive index, modulated with a substantially sinusoidal profile throughout a volumetric region. Each (simple/sinusoidal) grating corresponds to a single conjugate vector pair in k-space (or a substantially point-like conjugate pair distribution in k-space). The term "diffraction efficiency" refers to the ratio of the power of reflected light to incident light and on a grating medium. The term "entrance pupil" refers to a real or virtual aperture passing a beam of light, at its minimum size, entering into imaging optics. The term "eye box" refers to a two-dimensional area outlining a region wherein a human pupil may be placed for viewing the full field of view at a fixed distance from a grating structure. The term "eye relief" refers to a fixed distance between a grating structure and a corresponding eye box. The term "exit pupil" refers to a real or virtual aperture passing a beam of light, at its minimum size, emerging from imaging optics. In use, the imaging optics system is typically configured to direct the beam of light toward image capture means. Examples of image capture means include, but are not limited to, a user's eye, a camera, or other photodetector. In some cases, an exit pupil may comprise a subset of a beam of light emerging from imaging optics.

The term "grating medium" refers to a physical medium that is configured with a grating structure for reflecting light. A grating medium may include multiple grating structures. The term "grating structure" refers to one or more gratings configured to reflect light. In some examples, a grating structure may include a set of gratings that share at least one common attribute or characteristic (e.g., a same wavelength of light to which each of the set of gratings is responsive). In some implementations, a grating structure may include one or more holograms. In other implementations, a grating structure may include one or more sinusoidal volume gratings. In some examples, the grating structures may be uniform with respect to a reflective axis for each of the one or more gratings (e.g., holograms or sinusoidal gratings). Alternatively or additionally, the grating structures may be uniform with respect to a length or volume for each of the one or more gratings (e.g., holograms or sinusoidal volume gratings) within the grating medium. Skew mirrors as described herein may sometimes also be referred to herein as grating structures, holographic grating structures, or volume holographic grating structures.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

In accordance with an embodiment, an optical device is provided that includes a waveguide having a waveguide surface, where the waveguide surface has a longitudinal dimension and a perpendicular lateral dimension, and light homogenizing structures on the waveguide, where the light homogenizing structures are configured to receive input light and to produce longitudinally homogenized light by homogenizing the input light along the longitudinal dimension.

In accordance with any combination of the above embodiments, the optical device further includes a cross-coupler configured to receive the longitudinally homogenized light from the light homogenizing structures and to produce two-dimensionally homogenized light by redirecting the longitudinally homogenized light along the lateral dimension.

In accordance with any combination of the above embodiments, the cross-coupler is configured to diffract the longitudinally homogenized light on both upwards and downwards passes through the cross-coupler.

In accordance with any combination of the above embodiments, the light homogenizing structures include a substrate and a partially reflective layer on the substrate, where the partially reflective layer is configured to transmit and reflect the input light at least twice.

In accordance with any combination of the above embodiments, the partially reflective layer has a spatially-varying reflectivity.

In accordance with any combination of the above embodiments, the substrate is mounted to the waveguide surface.

In accordance with any combination of the above embodiments, the partially reflective layer is interposed between the substrate and the waveguide surface.

In accordance with any combination of the above embodiments, the partially reflective layer is embedded in the substrate.

In accordance with any combination of the above embodiments, the substrate is a waveguide substrate and comprises the waveguide surface.

In accordance with any combination of the above embodiments, he partially reflective layer includes a structure selected from the group consisting of a dielectric coating, a metallic coating, a polymer film, and a set of holograms.

In accordance with any combination of the above embodiments, the light homogenizing structures include a substrate having opposing first and second surfaces, a first reflective layer on the first surface, a second reflective layer on the second surface, and a partially reflective layer on the substrate and interposed between the first and second reflective layers.

In accordance with any combination of the above embodiments, the first and second reflective layers and the partially reflective layer extend perpendicular to the waveguide surface.

In accordance with any combination of the above embodiments, the first reflective layer includes an aperture for the input light and the partially reflective layer is closer to the first reflective layer than the second reflective layer.

In accordance with any combination of the above embodiments, the light homogenizing structures include a substrate mounted to the waveguide surface and having an index of refraction greater than or equal to 1.83 and a prism mounted to the substrate.

In accordance with another embodiment, an optical system is provided that includes a waveguide having first and second waveguide substrates and a grating medium interposed between the first and second waveguide substrates, an input coupling means mounted to the waveguide at a first end of the waveguide and configured to couple input light into the waveguide, and a partial reflector on the waveguide, where the partial reflector has a spatially-varying reflectivity and is configured to homogenize the input light within one pupil period at a second end of the waveguide.

In accordance with any combination of the above embodiments, the partial reflector includes a first region at the first end of the waveguide with a first reflectivity and a second region with a second reflectivity less than the first reflectivity, where the second region is interposed between the first region and the second end of the waveguide.

In accordance with any combination of the above embodiments, the partial reflector has a continuously variable reflectivity profile across its length.

In accordance with any combination of the above embodiments, the partial reflector is embedded within the waveguide.

In accordance with any combination of the above embodiments, the optical system further includes a substrate mounted to the waveguide and having an end at the input coupling means, where the partial reflector is formed on a bottom surface of the input coupling means and the substrate.

In accordance with another embodiment, a head mounted display device is provided that includes a light source, a waveguide having a planar exterior surface, longitudinal light homogenizing structures comprising a substrate mounted to the planar exterior surface and configured to homogenize light from the light source along a longitudinal dimension of the waveguide, and a cross-coupler embedded in the waveguide, where the cross-coupler is configured to redirect the homogenized light along a lateral dimension of the waveguide.

The foregoing is merely illustrative and various modifications can be made to the described embodiments. The foregoing embodiments may be implemented individually or in any combination.

What is claimed is:

1. An optical device comprising:
   a waveguide having a waveguide surface and configured to propagate light that includes images; and
   light homogenizing structures on the waveguide and configured to homogenize the light, the light homogenizing structures comprising:
   a substrate having opposing first and second surfaces,
   a first reflective layer on the first surface,
   a second reflective layer on the second surface, and
   a partially reflective layer on the substrate and interposed between the first and second reflective layers, wherein the first and second reflective layers and the partially reflective layer extend perpendicular to the waveguide surface.

2. The optical device defined in claim 1, wherein the light homogenizing structures are configured to produce longitudinally homogenized light by homogenizing the light along a longitudinal dimension of the waveguide, the optical device further comprising:
   a cross-coupler configured to receive the longitudinally homogenized light from the light homogenizing structures and configured to produce two-dimensionally homogenized light by redirecting the longitudinally homogenized light along a lateral dimension of the waveguide that is orthogonal to the longitudinal dimension.

3. The optical device defined in claim 2, wherein the cross-coupler is configured to diffract the longitudinally homogenized light on both upwards and downwards passes through the cross-coupler.

4. The optical device defined in claim 1, wherein the partially reflective layer is configured to transmit and reflect the input light at least twice.

5. The optical device defined in claim 4, wherein the partially reflective layer has a spatially-varying reflectivity.

6. The optical device defined in claim 1, wherein the partially reflective layer is embedded in the substrate.

7. The optical device defined in claim 5, wherein the partially reflective layer comprises a structure selected from the group consisting of: a dielectric coating, a metallic coating, a polymer film, and a set of holograms.

8. The optical device defined in claim 1, wherein the first reflective layer comprises an aperture for the input light and wherein the partially reflective layer is closer to the first reflective layer than the second reflective layer.

9. The optical device defined in claim 1, wherein the substrate has an index of refraction greater than or equal to 1.83 and the optical device further comprises
   a prism mounted to the substrate.

10. An optical system comprising:
    a waveguide having first and second waveguide substrates and a grating medium interposed between the first and second waveguide substrates, wherein the waveguide has a first end and a second end opposite the first end;
    an input coupler at the first end of the waveguide and configured to couple input light into the waveguide; and
    a partial reflector on the waveguide, wherein the partial reflector has a spatially-varying reflectivity and is configured to homogenize the input light, wherein the partial reflector comprises a first region at the first end of the waveguide with a first reflectivity and a second region with a second reflectivity less than the first reflectivity, and wherein the second region is interposed between the first region and the second end of the waveguide.

11. The optical system defined in claim 10, wherein the partial reflector is configured to homogenize the input light within one pupil period at the second end of the waveguide and wherein the partial reflector has a continuously variable reflectivity profile across its length.

12. The optical system defined in claim 10, wherein the partial reflector is embedded within the waveguide.

13. The optical system defined in claim 10, further comprising a substrate mounted to the waveguide and having an end at the input coupler, wherein the partial reflector is disposed on a bottom surface of the input coupler and on the substrate.

14. A display device comprising:
    a light source;
    a waveguide having a planar exterior surface; and
    longitudinal light homogenizing structures comprising a substrate mounted to the planar exterior surface and configured to homogenize light from the light source along a longitudinal dimension of the waveguide wherein:
    the substrate has a first surface and a second surface opposite the first surface,
    the waveguide comprises a first waveguide substrate that has the planar exterior surface, a second waveguide substrate, and a grating medium sandwiched between the first waveguide substrate and the second waveguide substrate, and
    the longitudinal light homogenizing structures comprise a partially reflective layer interposed between the substrate and the planar exterior surface.

15. An optical device comprising:
    a waveguide having a waveguide surface, wherein the waveguide surface has a longitudinal dimension and a perpendicular lateral dimension; and
    light homogenizing structures on the waveguide, wherein the light homogenizing structures are configured to receive input light and to produce longitudinally homogenized light by homogenizing the input light along the longitudinal dimension, the light homogenizing structures comprise a substrate mounted to the waveguide surface and a partial reflector on the substrate, the waveguide has a first end and a second end, the partial reflector has a first region at the first end of the waveguide with a first reflectivity and a second region with a second reflectivity less than the first reflectivity, and the second region is laterally interposed between the first region and the second end of the waveguide.

16. The display device of claim 14, wherein the partially reflective layer contacts both the second surface of the substrate and the planar exterior surface of the first waveguide substrate.

17. The display device of claim 16, further comprising:
    a cross-coupler on the waveguide and configured to redirect the homogenized light along a lateral dimension of the waveguide.

18. The display device of claim 17, wherein the cross-coupler is embedded in the grating medium.

19. The display device of claim 18, further comprising:
an input coupling prism mounted to the second surface of the substrate.

20. The display device of claim 14, further comprising:
an input coupling prism mounted to the second surface of the substrate.

\* \* \* \* \*